US009773258B2

(12) United States Patent
Woycik et al.

(10) Patent No.: US 9,773,258 B2
(45) Date of Patent: Sep. 26, 2017

(54) SUBLIMINAL SUGGESTIVE UPSELL SYSTEMS AND METHODS

(71) Applicant: Nextep Systems, Inc., Troy, MI (US)

(72) Inventors: Thomas Edward Woycik, Birmingham, MI (US); Marshall Bruce Cummings, Troy, MI (US)

(73) Assignee: Nextep Systems, Inc., Troy, MI (US)

( * ) Notice: Subject to any disclaimer, the term of this patent is extended or adjusted under 35 U.S.C. 154(b) by 0 days.

(21) Appl. No.: 14/581,042

(22) Filed: Dec. 23, 2014

(65) Prior Publication Data

US 2015/0227978 A1 Aug. 13, 2015

Related U.S. Application Data

(60) Provisional application No. 61/938,914, filed on Feb. 12, 2014.

(51) Int. Cl.
*G06Q 30/02* (2012.01)
*G06Q 50/12* (2012.01)
(Continued)

(52) U.S. Cl.
CPC ......... *G06Q 30/0268* (2013.01); *G06Q 20/18* (2013.01); *G06Q 30/0623* (2013.01); *G06Q 50/12* (2013.01)

(58) Field of Classification Search
CPC .... G06Q 30/0268; G06Q 50/12; G06Q 20/18; G06Q 30/0623
See application file for complete search history.

(56) References Cited

U.S. PATENT DOCUMENTS 5,017,143 A * 5/1991 Backus ................. G09B 19/00
348/564
5,353,219 A 10/1994 Mueller et al.
(Continued)

FOREIGN PATENT DOCUMENTS

WO WO-2008124869 A1 10/2008
WO WO-201430161 A1 2/2014
WO WO-2014128709 A1 8/2014

OTHER PUBLICATIONS

Brachmann, Steve; "Whirlpool Applicances Detect Biometric Characteristics of the User"; IPWatchdog.com <http://www.ipwatchdog.com/2013/11/04/whirlpool-appliances-detect-biometric-characteristics-of-the-user/id=46042/?utm_source=feedburner&utm_medium=email&utm_campaign=Feed%3A+Ipwatchdog+%28IPWatchdog.com%29>. Nov. 4, 2013; 6 Pages.

(Continued)

*Primary Examiner* — Asfand Sheikh
(74) *Attorney, Agent, or Firm* — Harness, Dickey & Pierce, P.L.C.

(57) ABSTRACT

A method of upselling ordering items includes: in response to detection of a patron at or approaching an ordering terminal, capturing N sets of identification data for the patron using N passive patron identification systems, respectively, wherein N is an integer greater than one; calculating an overall confidence value indicating a level of confidence that the patron is associated with a unique patron identifier based on N comparisons of the N sets of identification data with N sets of stored identification data, respectively, associated with the unique patron identifier; based on the unique patron identifier, retrieving stored data indicative of an ordering item that is to be subliminally suggested to the patron during ordering; using the ordering terminal, displaying an ordering menu; and, when the overall confidence (Continued)

value is greater than a predetermined value, subliminally suggesting the ordering item to the patron while the patron places an order.

17 Claims, 15 Drawing Sheets

(51) Int. Cl.
*G06Q 20/18* (2012.01)
*G06Q 30/06* (2012.01)

(56) References Cited

U.S. PATENT DOCUMENTS

| | | | |
|---|---|---|---|
| 6,125,172 A * | 9/2000 | August et al. | 379/110.01 |
| 6,553,131 B1 | 4/2003 | Neubauer et al. | |
| 6,747,687 B1 | 6/2004 | Alves | |
| 6,914,582 B2 | 7/2005 | Tanaka | |
| 7,454,370 B2 | 11/2008 | Baril et al. | |
| 7,791,495 B1 | 9/2010 | Green et al. | |
| 8,068,986 B1 * | 11/2011 | Shahbazi | H04L 63/126 |
| | | | 342/28 |
| 8,447,112 B2 | 5/2013 | Paul et al. | |
| 8,626,614 B2 | 1/2014 | Barber et al. | |
| 8,888,492 B2 | 11/2014 | Riscalla | |
| 2002/0059387 A1 * | 5/2002 | Wolfe | G06Q 30/02 |
| | | | 709/206 |
| 2002/0169461 A1 | 11/2002 | Simon et al. | |
| 2003/0105667 A1 * | 6/2003 | Millikan | G06Q 30/02 |
| | | | 705/14.58 |
| 2003/0130932 A1 | 7/2003 | Wong | |
| 2004/0069313 A1 | 4/2004 | DeLaquil | |
| 2004/0143512 A1 | 7/2004 | Sturr | |
| 2004/0193313 A1 * | 9/2004 | Cornet | G09F 27/00 |
| | | | 700/231 |
| 2005/0001030 A1 * | 1/2005 | Allen | G06Q 30/02 |
| | | | 235/383 |
| 2005/0049922 A1 | 3/2005 | Kargman | |
| 2005/0099316 A1 * | 5/2005 | Lake | G09F 19/18 |
| | | | 340/815.4 |
| 2005/0107158 A1 | 5/2005 | Kanisawa et al. | |
| 2006/0220912 A1 | 10/2006 | Heenan et al. | |
| 2007/0038516 A1 * | 2/2007 | Apple et al. | 705/14 |
| 2007/0150747 A1 | 6/2007 | Mani et al. | |
| 2007/0271512 A1 * | 11/2007 | Knight et al. | 715/700 |
| 2007/0294129 A1 | 12/2007 | Froseth et al. | |
| 2008/0065468 A1 * | 3/2008 | Berg | G06Q 30/02 |
| | | | 705/7.32 |
| 2008/0140448 A1 | 6/2008 | Hernandez et al. | |
| 2008/0172243 A1 * | 7/2008 | Kelly | 705/1 |
| 2009/0057401 A1 | 3/2009 | Brott et al. | |
| 2009/0232354 A1 * | 9/2009 | Camp, Jr. | G06Q 30/02 |
| | | | 382/103 |
| 2009/0259558 A1 | 10/2009 | Carroll et al. | |
| 2010/0057871 A1 | 3/2010 | Kaplan et al. | |
| 2010/0106607 A1 | 4/2010 | Riddiford et al. | |
| 2010/0114783 A1 * | 5/2010 | Spolar | 705/80 |
| 2010/0234987 A1 * | 9/2010 | Benschop et al. | 700/237 |
| 2011/0029866 A1 | 2/2011 | Watanabe et al. | |
| 2011/0231266 A1 | 9/2011 | Baril | |
| 2011/0296355 A1 | 12/2011 | Hrabosky | |
| 2011/0321073 A1 * | 12/2011 | Yarvis | H04N 21/252 |
| | | | 725/10 |
| 2012/0150562 A1 | 6/2012 | Lerner | |
| 2012/0158171 A1 | 6/2012 | Day et al. | |
| 2012/0246007 A1 | 9/2012 | Williams et al. | |
| 2013/0046166 A1 | 2/2013 | Maleki Jafarabadi et al. | |
| 2013/0185354 A1 | 7/2013 | Seligstein et al. | |
| 2013/0283183 A1 | 10/2013 | Knight et al. | |
| 2014/0039998 A1 | 2/2014 | Hancock et al. | |
| 2014/0089077 A1 | 3/2014 | Zuckerman et al. | |
| 2014/0100971 A1 * | 4/2014 | Klearman | G06Q 30/0641 |
| | | | 705/15 |
| 2014/0109013 A1 | 4/2014 | Woycik et al. | |

OTHER PUBLICATIONS

Non-Final Office Action for U.S. Appl. No. 14/580,927 dated Jan. 21, 2016.
U.S. Appl. No. 14/580,927, filed Dec. 23, 2014, Thomas Woycik.
Advisory Action for U.S. Appl. No. 14/581,042 dated Jan. 11, 2016.
Office Action regarding U.S. Appl. No. 14/580,927. dated Apr. 13, 2017.

* cited by examiner

SUBLIMINAL SUGGESTIVE UPSELL SYSTEMS AND METHODS

CROSS-REFERENCE TO RELATED APPLICATIONS

This application claims the benefit of U.S. Provisional Application No. 61/938,914, filed on Feb. 12, 2014. This application is related to U.S. patent application Ser. No. 14/580,927, titled Passive Patron Identification Systems and Methods, filed on the same day as this application. The entire disclosure of the application referenced above is incorporated herein by reference.

FIELD

The present disclosure relates to digital ordering systems and more particularly to systems and methods for subliminally presenting ordering items.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Point of sale (POS) terminals are used at various establishments to facilitate the purchase of various goods and services. For example, a POS terminal may be used at a restaurant to order and/or purchase food, beverage, and other offerings of the restaurant. POS terminals may be employee operated.

Some restaurants include self-service kiosks where the patrons interface a kiosk to place orders, such as using a touch screen display. A patron placing an order via a self-service kiosk may also be able to pay for their order at the self-service kiosk, such as by using a credit card or another suitable form of payment.

SUMMARY

In a feature, a method of upselling ordering items is disclosed. The method includes: in response to detection of a patron at or approaching an ordering terminal, capturing N sets of identification data for the patron using N passive patron identification systems, respectively, wherein N is an integer greater than one; calculating an overall confidence value indicating a level of confidence that the patron is associated with a unique patron identifier based on N comparisons of the N sets of identification data with N sets of stored identification data, respectively, associated with the unique patron identifier; based on the unique patron identifier, retrieving stored data indicative of an ordering item that is to be subliminally suggested to the patron during ordering; using the ordering terminal, displaying an ordering menu; and, when the overall confidence value is greater than a predetermined value, using the ordering terminal, subliminally suggesting the ordering item to the patron while the patron places an order.

In further features, subliminally suggesting the ordering item to the patron at the ordering terminal includes displaying an image of the ordering item at a predetermined frequency on a display of the ordering terminal.

In further features, the predetermined frequency is 1 Hertz or less.

In further features, subliminally suggesting the ordering item to the patron at the ordering terminal includes outputting sound associated with the ordering item outside of a predetermined frequency range using a speaker of the ordering terminal.

In further features, subliminally suggesting the ordering item to the patron at the ordering terminal includes outputting, using a speaker of the ordering terminal, sound associated with the ordering item at a volume that is less than a predetermined volume.

In further features, the method further includes: selectively retrieving stored data indicative of a second ordering item that is to be subliminally suggested to patrons during ordering; and, when the overall confidence value is less than the predetermined value, using the ordering terminal, subliminally suggesting the second ordering item to the patron while the patron places the order.

In further features, selectively retrieving stored data indicative of the second ordering item that is to be subliminally suggested to patrons during ordering includes retrieving the stored data indicative of the second ordering item when a condition at the ordering terminal satisfies a predetermined condition associated with subliminally suggesting the second ordering item to patrons.

In further features, selectively retrieving stored data indicative of the second ordering item that is to be subliminally suggested to patrons during ordering includes retrieving the stored data indicative of the second ordering item when a present date is within a predetermined date range associated with subliminally suggesting the second ordering item to patrons.

In further features, selectively retrieving stored data indicative of the second ordering item that is to be subliminally suggested to patrons during ordering includes retrieving the stored data indicative of the second ordering item when a present time of day at the ordering terminal is within a predetermined time range associated with subliminally suggesting the second ordering item to patrons.

In further features, selectively retrieving stored data indicative of the second ordering item that is to be subliminally suggested to patrons during ordering includes retrieving the stored data indicative of the second ordering item when a temperature at the ordering terminal is within a predetermined temperature range associated with subliminally suggesting the second ordering item to patrons.

In further features, the method further includes: based on at least one of the N sets of identification data, determining whether the patron has a general characteristic of patrons; and, when the patron has the general characteristic: retrieving stored data indicative of a second ordering item that is to be subliminally suggested to patrons having the general characteristic during ordering; and subliminally suggesting the second ordering item to the patron while the patron places the order.

In a feature, an ordering system is disclosed. N passive patron identification systems, in response to detection of a patron, capture N sets of identification data for the patron, respectively, wherein N is an integer greater than one. A confidence calculation module calculates an overall confidence value indicating a level of confidence that the patron is associated with a unique patron identifier based on N comparisons of the N sets of identification data with N sets of stored identification data, respectively, associated with the unique patron identifier. A profile retrieving module, based on the unique patron identifier, retrieves stored data indicative of an ordering item that is to be subliminally suggested to the patron during ordering. A control module displays an ordering menu on a display of an ordering terminal and, via the ordering terminal and when the overall confidence value is greater than a predetermined value, subliminally suggests the ordering item to the patron while the patron places an order.

In further features, the control module subliminally suggests the ordering item by displaying an image of the ordering item at a predetermined frequency on the display of the ordering terminal.

In further features, the predetermined frequency is 1 Hertz or less.

In further features, the control module subliminally suggests the ordering item by outputting sound associated with the ordering item outside of a predetermined frequency range using a speaker of the ordering terminal.

In further features, the control module subliminally suggests the ordering item by outputting, using a speaker of the ordering terminal, sound associated with the ordering item at a volume that is less than a predetermined volume.

In further features, a general upsell module selectively retrieves stored data indicative of a second ordering item that is to be subliminally suggested to patrons during ordering, wherein, when the overall confidence value is less than the predetermined value, via the ordering terminal, the control module subliminally suggests the second ordering item to the patron while the patron places the order.

In further features, the general upsell module retrieves the stored data indicative of the second ordering item when a condition at the ordering terminal satisfies a predetermined condition associated with subliminally suggesting the second ordering item to patrons.

In further features, the general upsell module retrieves the stored data indicative of the second ordering item when a present date is within a predetermined date range associated with subliminally suggesting the second ordering item to patrons.

In further features, the general upsell module retrieves the stored data indicative of the second ordering item when a present time of day at the ordering terminal is within a predetermined time range associated with subliminally suggesting the second ordering item to patrons.

In further features, the general upsell module retrieves the stored data indicative of the second ordering item when a temperature at the ordering terminal is within a predetermined temperature range associated with subliminally suggesting the second ordering item to patrons.

In further features, a characteristic determination module, based on at least one of the N sets of identification data, determines whether the patron has a general characteristic of patrons, wherein, when the patron has the general characteristic: the profile retrieving module further retrieves stored data indicative of a second ordering item that is to be subliminally suggested to patrons having the general characteristic during ordering; and the control module subliminally suggests the second ordering item to the patron while the patron places the order.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
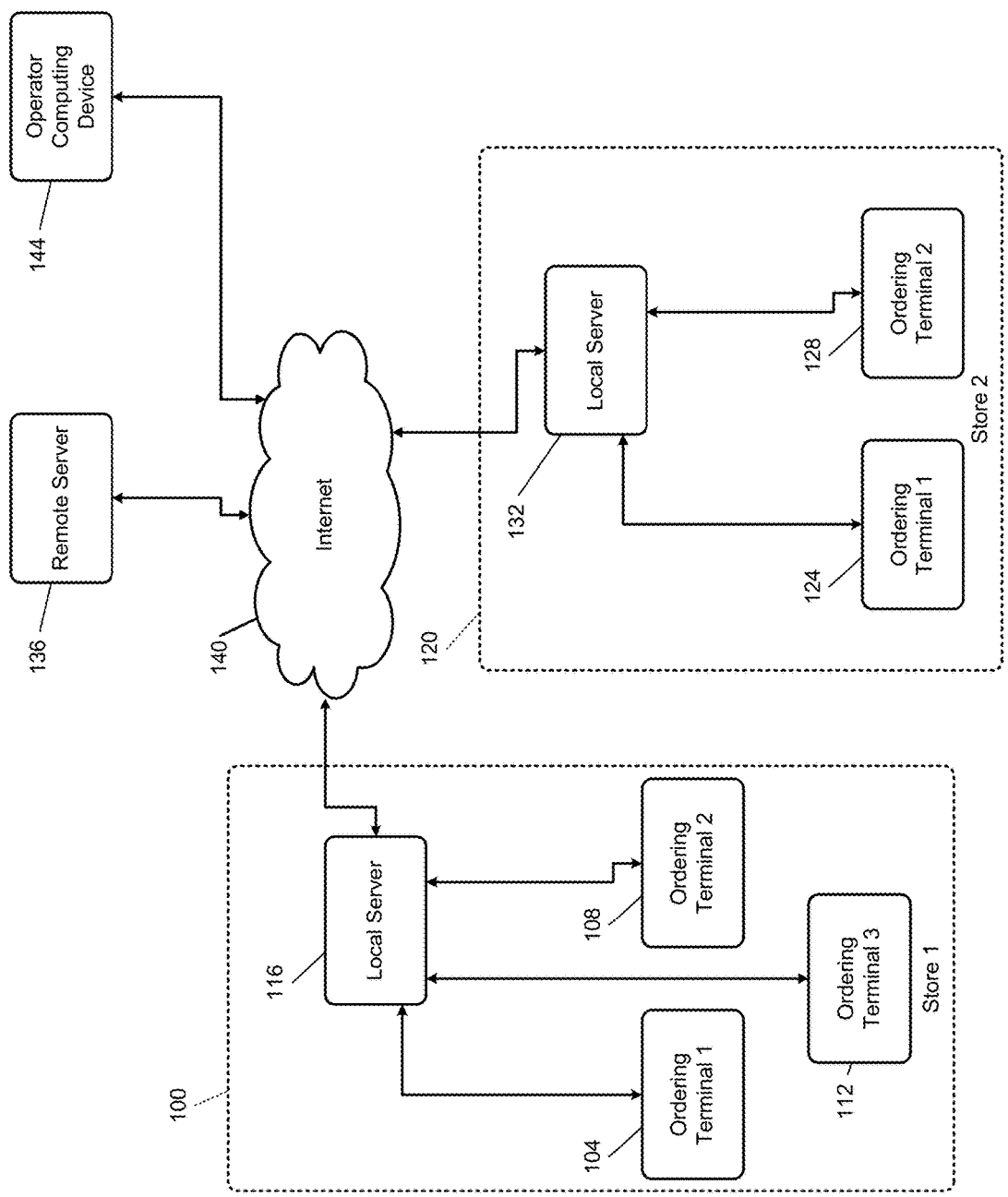
FIG. 1 is a functional block diagram of an example multiple-store ordering system.

An example multiple-store ordering system is shown in FIG. 1. A first restaurant 100 includes first, second, and third ordering terminals 104, 108, and 112, and a local server 116. A second restaurant 120 includes a first ordering terminal 124, a second ordering terminal 128, and a local server 132. In various implementations, an ordering terminal may serve as a local server. While the present disclosure will be discussed in terms of restaurants, the present disclosure is also applicable to other types of businesses, non-profit organizations, governmental entities, and other sellers of goods and/or services.

The ordering terminal(s) communicate with the local server of their restaurant. The local servers 116 and 132 also communicate with a remote server 136 via the Internet 140. One or more external computing devices, such as operator computing device 144, can communicate with the local servers 116 and 132 via the Internet 140. For example, an external computing device may be used by a manager or owner of multiple restaurants to configure or communicate with the ordering terminal(s) at different restaurants. The remote server 136 and the operator computing device 144 may communicate with the ordering terminals via the respective local servers. While a multiple-store ordering system is shown where each restaurant includes multiple ordering terminals, the present disclosure is applicable to a restaurant having one or more ordering terminals.

One type of ordering terminal is a walk-up self-service ordering terminal. Patrons approach a walk-up self-service ordering terminal on foot or otherwise and interface with (e.g., touch) the walk-up self-service ordering terminal to place an order. Another type of ordering terminal is a drive-up self-service ordering terminal. Patrons approach a drive-up self-service ordering terminal by vehicle and interface with (e.g., touch) the drive-up self-service ordering terminal to place an order. Self-service ordering terminals, including walk-up self-service ordering terminals, drive-up self-service ordering terminals, and other types of self-service ordering terminals may be referred to as kiosks.

Yet another type of ordering terminal is a menu board, such as a digital menu board and other types of menu boards. Patrons approach menu boards, for example, on foot or by vehicle. An employee interacts (e.g., speaks) with the patron and places an order for a patron via a separate ordering terminal. Orders placed via an ordering terminal are routed to a kitchen or another food preparation area for preparation of the ordered items.

Figure 2:
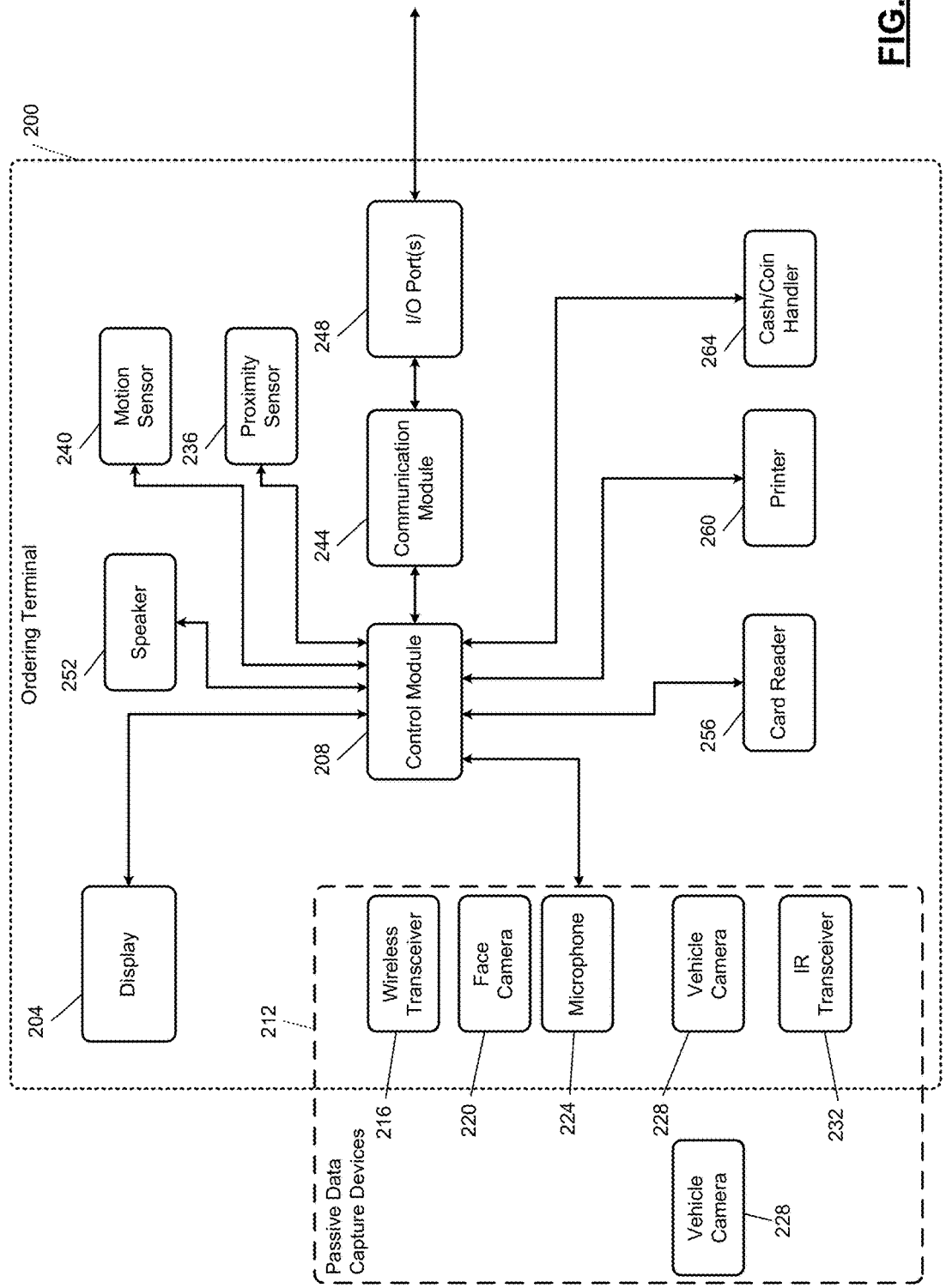
FIG. 2 is a functional block diagram of an example ordering terminal.

Referring now to FIG. 2, a functional block diagram of an example ordering terminal 200 is presented. The ordering terminal 200 includes a display 204 and a control module 208. The display 204 may be a touch screen display or a non-touchscreen display. For example, self-service ordering terminals (e.g., walk-up and drive-up types) may include touchscreen displays, and menu boards may include non-touchscreen displays. Employee operated ordering terminals may be referred to as point of sale (POS) terminals and may include touchscreen displays or non-touch screen displays. As described in detail below, the control module 208 controls what and how information is output (e.g., visually and/or audibly).

The ordering terminal 200 may include a plurality of passive data capture devices 212. For example only, the passive data capture devices 212 may include a wireless transceiver 216, a face camera 220, and/or a microphone 224. The passive data capture devices 212 may additionally or alternatively include one or more vehicle cameras 228, an infrared (IR) transceiver 232, a scent/smell sensor (not shown) and/or one or more other passive data capture devices. For example, drive-up self-service ordering terminals and menu boards used in a drive-up setting may include one or more vehicle cameras and/or an IR transceiver. Vehicle cameras and IR transceivers may be omitted in walk-up self-service ordering terminals, menu boards used in a walk-up ordering setting, and POS terminals.

Passive data capture devices are devices that capture data before a patron begins to place an order and/or while the patron places an order that can help identify the patron. Passive data capture devices capture data without patrons actively performing specific acts beyond those normally inherent to placing an order so that the patrons can be identified as being associated with stored patron data. By way of contrast with passive data capture devices, active data capture devices capture data based on acts performed by patrons specifically for patron identification, such as devices for capturing credit card information or patron account information. Patron account information may be obtained, for example, from the patron using the display 204, via an optical reader, etc.

The wireless transceiver 216 wirelessly receives signals from electronic devices near the ordering terminal 200 that are indicative of unique identifiers of the electronic devices, respectively. For example, the wireless transceiver 216 may receive an International Mobile Equipment Identity (IMEI), a radio frequency identifier (RFID), a Bluetooth identifier, and/or another unique identifier from an electronic device. In various implementations, the wireless transceiver 216 may transmit signals in order to cause, prompt, or solicit electronic devices near the wireless transceiver 216 to transmit signals indicative of their unique identifiers.

The face camera 220 may be located, for example, above the display 204 (e.g., centered) to capture facial images of patrons. For a POS terminal, the face camera 220 may face an area where patrons approach the POS terminal. The microphone 224 generates signals based on sound input to the microphone 224, such as voice and/or vehicle sound. One of the vehicle cameras 228 may be located to capture images including a rear portion of vehicles at the ordering terminal 200. Another one of the vehicle cameras 228 may be located to capture images including a front portion of vehicles at the ordering terminal 200. One or both of these vehicle cameras or one or more other vehicle cameras may be used to capture images of one or more wheels of vehicles. For example, one of the vehicle cameras 228 may be located in an area that vehicles approach the ordering terminal 200. This vehicle camera may capture images of one or more wheels of a vehicle as the vehicle approaches the ordering terminal 200 and also capture images of a rear portion of the vehicle. An image of a wheel may include a rim, a tire, one or more lug nuts, associated braking componentry, a wheel well, and/or other components of a vehicle. Braking componentry may include, for example, a rotor and a caliper where disc brakes are used and may include a drum where drum brakes are used.

The IR transceiver 232 may transmit an IR signal at painted portions of vehicles at the ordering terminal 200. The IR transceiver 232 may generate signals corresponding to paint formulation based on reflected IR signals.

The ordering terminal 200 includes one or more patron detection sensors, such as a proximity sensor 236, a motion sensor 240, and/or one or more other sensors for detecting the presence of a patron. The control module 208 detects the presence of a patron based on signals from the one or more patron detection sensors and/or one or more of the passive data capture devices 212.

When a patron is detected, and before or while presenting ordering information to the patron, the control module 208 may capture identification data for the patron using the passive data capture devices 212. For example, the control module 208 may capture a unique identifier of an electronic device of the patron (if available) via the wireless transceiver 216. When multiple electronic devices are near the ordering terminal 200, the control module 208 may capture multiple unique identifiers.

The control module 208 may capture one or more images of the face of the patron via the face camera 220. For example only, the control module 208 may capture an image of the face of the patron each time a touchscreen display is touched in self-service ordering terminals.

The control module 208 may capture audio based on speech of the patron via the microphone 224. The control module 208 may capture audio based on audible output of the vehicle via the microphone 224 or another microphone. The control module 208 may capture one or more images including the patron's vehicle via one or more of the vehicle cameras 228. The control module 208 may capture one or more images including one or more wheels of the patron's vehicle via one or more of the vehicle cameras 228. The control module 208 may capture data indicative of a paint formulation of the patron's vehicle via the IR transceiver 232. The control module 208 may capture the identification data before the patron begins to place an order so ordering information output to the patron can be set to enhance the ordering experience.

The control module 208 may process one or more sets of captured identification data. For example, the control module 208 may convert a captured image or a portion of a captured image to a lower resolution. For example only, the control module 208 may convert a captured 32-bit image or a portion of a captured image into a 16-bit image, an 8-bit image, a monochrome image, or another type of lower resolution image. The portion of a captured image may include, for example, the patron's face in a face image, the license plate in a vehicle image, or a rim, tire, and braking componentry in a wheel image. The control module 208 may select one or more portions of a captured image, for example, using edge and/or shape detection. Another example of processing is the control module 208 converting an audio clip taken via the microphone 224 into a smaller file. Yet another example of processing is the control module 208 converting a unique identifier of an electronic device into, for example, a hexadecimal value. Processing captured identification data may reduce the time necessary to transmit the captured data.

Another example of processing is the control module 208 may stitch together multiple images captured including a wheel of the vehicle to obtain a complete image of the braking componentry associated with that wheel. Portions of the rim, such as spokes, may block portions of the braking componentry if a single image is used. Using multiple images taken as the wheel rotates, however, a complete or more complete image of the braking componentry may be generated.

Another example of processing is the control module 208 may stitch together multiple images captured of a side of the vehicle as the vehicle passes a vehicle camera when approaching the ordering terminal 200 to obtain an image including a portion of a side or the entire side of the vehicle (e.g., driver or passenger side). The image of the entire side of the vehicle including features of the side of the vehicle (e.g., dings, dents, color, front and/or rear bumper shape, wheel wells, mirrors, etc.) can then be used for identification.

The ordering terminal 200 may output captured identification data for a patron at the ordering terminal 200 for comparison with stored identification data. The captured identification data may include one or more of the following types of data: face data generated based on a captured facial image of a patron; voice data generated based on a captured audio clip including speech of the patron; device data generated based on a received unique identifier of an electronic device; vehicle data generated based on a captured image of a portion of a vehicle of the patron; and wheel data generated based on a captured image including a wheel of the vehicle of the patron.

A communication module 244 may transmit the captured identification data to a patron identification server, such as the remote server 136. The communication module 244 may transmit the captured identification data by wire via one or more input/output (I/O) ports 248 or wirelessly via one or more antennas (not shown).

The ordering terminal 200 may include a speaker 252, a card reader 256, a printer 260, and/or a cash and coin handler 264. The ordering terminal 200 may include a radio frequency identifier (RFID) reader, an optical scanner, and/or one or more other components that are not shown. The speaker 252 is be used to output sound to patrons. The card reader 256 may read credit cards, patron account cards, etc. The printer 260 may print order receipts. The cash and coin handler 264 receives and counts currency and coins input to the ordering terminal 200. The cash and coin handler 264 may also dispense currency and coins.

Figure 3:
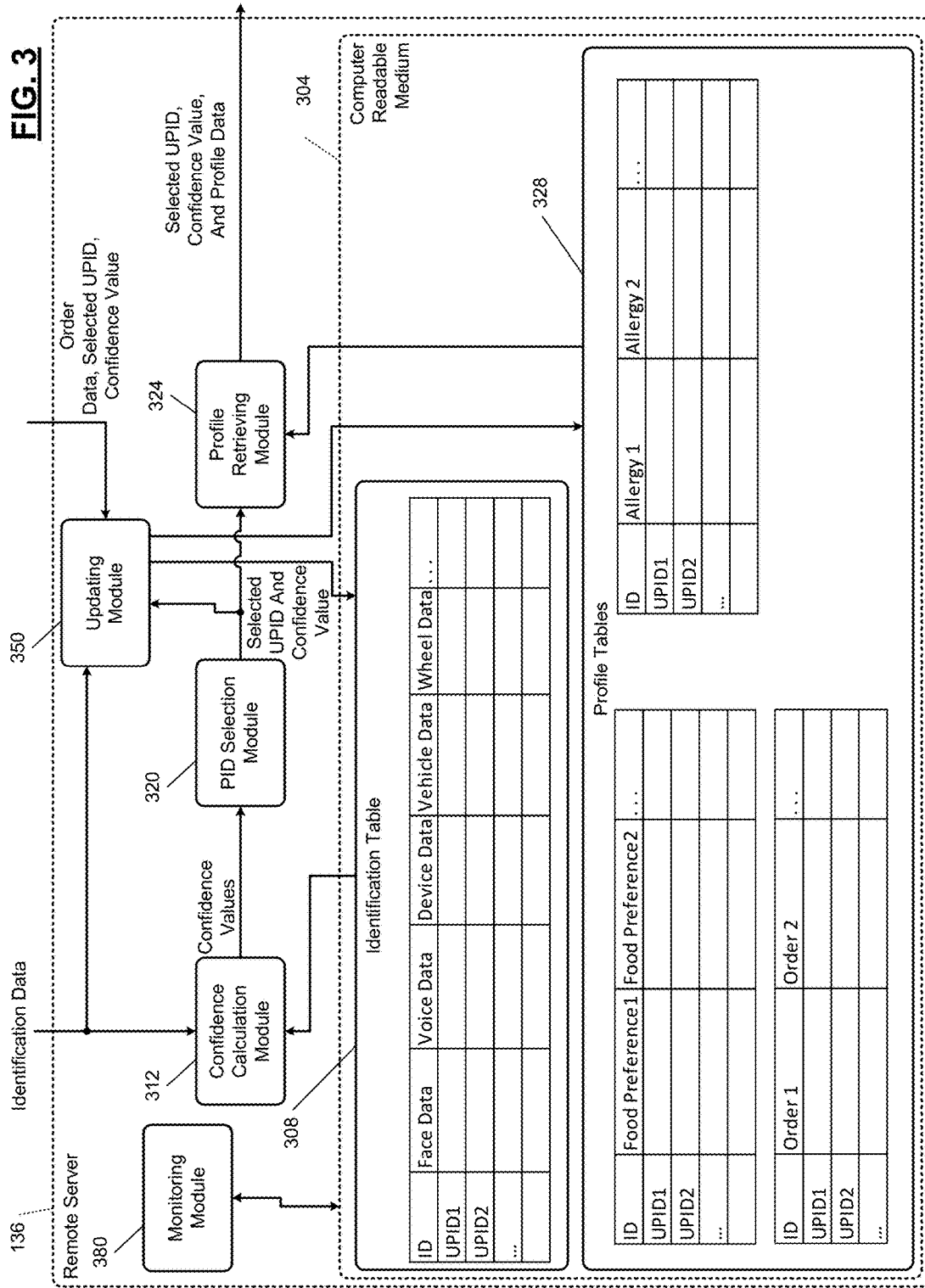
FIG. 3 is a functional block diagram of an example implementation of an identification server.

Referring now to FIG. 3, a functional block diagram of an example implementation of the remote server 136 is presented. While the example of FIG. 3 is discussed in conjunction with the remote server 136, all or one or more portions of the following functionality may be performed by another device, such the ordering terminal 200 or a local server at the same store as the ordering terminal 200. Also, while a particular module configuration is shown, the modules may be combined or partitioned differently.

A computer readable medium 304 includes an identification table 308. The identification table 308 includes unique patron identifiers (UPIDs) (e.g., numeric values), such as UPID1, UPID2, etc. The identification table 308 also includes identification data that is associated with each UPID. UPIDs and captured identification data may be added to or updated in the identification table 308 as patrons place orders using the ordering terminal 200 or one or more other ordering terminals, as discussed further below.

Each UPID has one or more pieces of associated, previously captured identification data. For example, UPID1 may have one or more of the following pieces of identification data stored in associated with it in the identification table 308: face data generated based on one or more previously captured facial images; voice data generated based on a previously captured audio clip including speech; device data generated based on a unique identifier of an electronic device received; vehicle data generated based on one or more previously captured images of a vehicle; and wheel data generated based on one or more previously captured images of wheels of a vehicle.

A confidence calculation module 312 calculates an overall confidence value for each of the UPIDs based on comparisons of the received identification data for the patron with the identification associated with the UPIDs, respectively. For example, the confidence calculation module 312 calculates an overall confidence value for UPID1 based on: a comparison of received face data with stored face data associated with UPID1; a comparison of received voice data with stored voice data associated with UPID1; a comparison of received device data with stored device data associated with UPID1; a comparison of received vehicle data with stored vehicle data associated with UPID1; and a comparison of received vehicle data with stored vehicle data associated with UPID1. The overall confidence values correspond to a level of confidence that the patron at the ordering terminal 200 (for which the received identification was captured) is the same as the patron based upon which that UPID was created and the associated identification data was stored.

Figure 4:
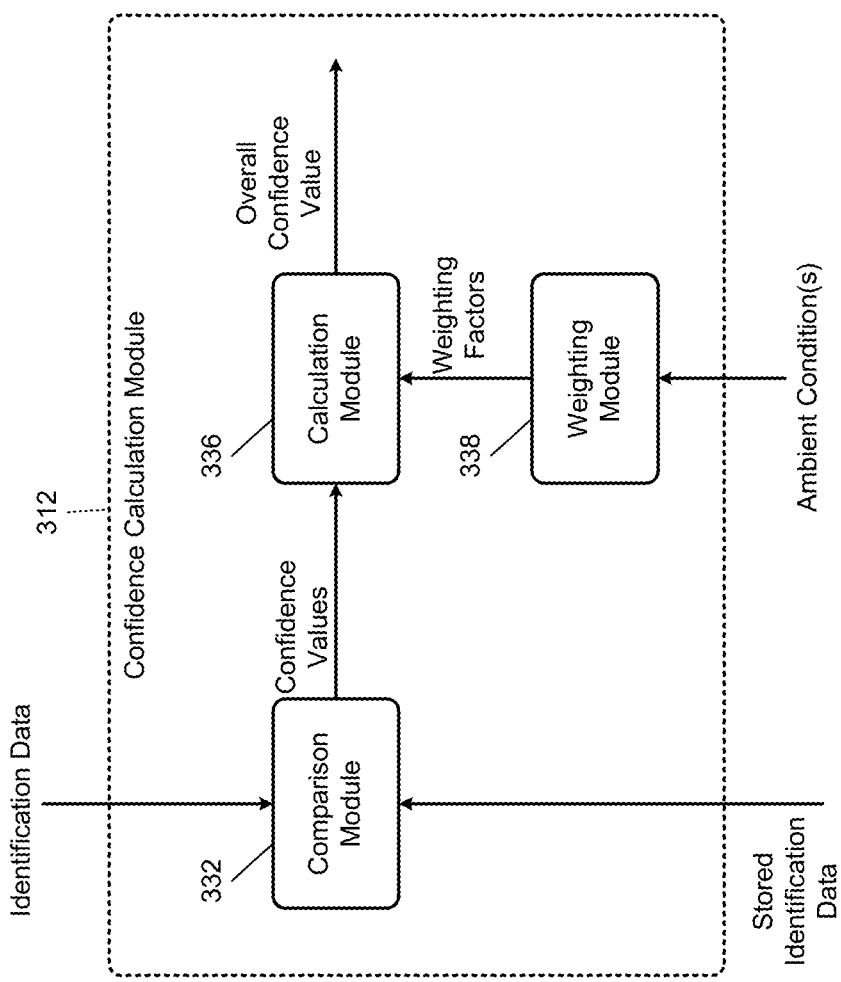
FIG. 4 is a functional block diagram of an example implementation of a confidence calculation module.

FIG. 4 includes a functional block diagram of an example implementation of the confidence calculation module 312. A comparison module 332 generates the partial confidence values based on comparisons of the received identification data for the patron with the identification associated with the UPIDs, respectively. The partial confidence values calculated for a UPID are used to calculate the overall confidence value for the UPID.

A calculation module 336 may calculate the overall confidence value for UPID1 based on the equation:

$$C1 = 1 - \Pi_{m=1}^{n}(1 - Wm*Cm),$$

where C1 is the overall confidence value for the UPID1, Π denotes use of the product function, n is an integer equal to the number of comparisons and different types of identification data, m is an integer, Cm is a partial confidence value between 0 and 1 calculated based on an m-th comparison of an m-th piece of received identification data and a corresponding piece of stored identification data associated with the UPID1, and Wm is a weighting value indicative of the extent to which the m-th comparison affects the overall confidence value C1.

The comparison module 332 may increase Cm as closeness of the m-th piece of received identification data to the corresponding piece of stored identification data associated with the UPID1 decreases, and vice versa. As such, the overall confidence value C1 will decrease as the closeness of the m-th piece of received identification data to the corresponding piece of stored identification data associated with the UPID1 decreases, and vice versa.

The above equation can be expanded and re-written as:

$$C1=1-[(1-Wf*Cf)*(1Wvo*Cvo)*(1-Wd*Cd)*(1-Wve*Cve)*(1-Ww*Cw)* \ldots *(1-Wn*Cn)],$$

where C1 is an overall confidence value for UPID1. The calculation module 336 calculates an overall confidence value for each UPID.

Cf is a partial confidence value between 0 and 1 calculated by the comparison module 332 based on a comparison of received face data with stored face data associated with UPID1, and Wf is a weighting factor associated with the extent to which the comparison of received face data with stored face data should affect the overall confidence values. Cvo is a partial confidence value between 0 and 1 calculated by the comparison module 332 based on a comparison of received voice data with stored voice data associated with UPID1, and Wvo is a weighting factor associated with the extent to which the comparison of received voice data with stored voice data should affect the overall confidence values. Cd is a partial confidence value between 0 and 1 calculated by the comparison module 332 based on a comparison of received device data with stored device data associated with UPID1, and Wd is a weighting factor associated with the extent to which the comparison of received device data with stored device data should affect the overall confidence values. Cve is a partial confidence value between 0 and 1 calculated by the comparison module 332 based on a comparison of vehicle data with stored vehicle data associated with UPID1, and Wve is a weighting factor associated with the extent to which the comparison of vehicle data with stored vehicle data should affect the overall confidence values. Cw is a partial confidence value between 0 and 1 calculated by the comparison module 332 based on a comparison of received wheel data with stored wheel data associated with UPID1, and Ww is a weighting factor associated with the extent to which the comparison of received wheel data with stored wheel data should affect the overall confidence values.

The above equation can be further expanded, as indicated by the ellipsis and inclusion of Cn and Wn. Cn is a partial confidence value between 0 and 1 calculated by the comparison module 332 based on a comparison of another piece of received identification data with stored identification data associated with UPID1, and Wn is a weighting factor associated with the extent to which that comparison should affect the overall confidence values. For example only, the above equation can be expanded to include weighting values and comparisons of wheel data received for one or more other wheels with stored wheel data for the other wheels, respectively, and/or comparisons of front and rear of vehicle data with stored front and rear of vehicle data, respectively.

A weighting module 338 sets the weighting factors. The weighting factors may be fixed values or variable values and are values between 0 and 1, inclusive. For example, the weighting factor Wd may be greater than all of the other weighting factors. The weighting factor Wf may be less than the weighting factor Wd and greater than all of the other weighting factors.

If variable, the weighting module 338 may adjust one or more of the weighting factors, for example, based on one or more ambient conditions and/or based on one or more other parameters. For example, the weighting module 338 may decrease the weighting factor Ww, the weighting factor Wve, and/or the weighting factor Wf as ambient lighting decreases and vice versa. The ordering terminal 200 may include an ambient lighting sensor (not shown) and provide measurements to the remote server 136. In various implementations, ambient lighting at the ordering terminal 200 may be determined by an ambient lighting module (not shown) based on the date, time, and/or weather at the ordering terminal 200.

The weighting module 338 may additionally or alternatively increase the weighting factor Wd and decrease one or more other weighting factors when the received identification includes device data generated based on a received unique identifier of an electronic device. For example, the weighting module 338 may set the weighting factor Wd to approximately 1.0 and set the other weighting factors to approximately 0 when the received identification includes device data generated based on a received unique identifier of an electronic device.

Based on the identification data received and the stored identification data, the confidence calculation module 312 may adjust the overall confidence value calculation. For example, if the received identification does not include one type of identification data or one type of identification has not been previously stored for a UPID, the comparison module 332 may set the partial confidence value for that type of data to zero. As such, the term in the equation above associated with that type of data will be set to 1 and, therefore, not affect the calculation of the overall confidence values. For example only, if the received identification data does not include vehicle data, the comparison module 332 may set the partial confidence value Cv to zero. Additionally or alternatively, if the received identification does not include one type of identification data or one type of identification has not been previously stored for a UPID, the weighting module 338 may set the weighting factor for that comparison to zero.

The comparison module 332 calculates the partial confidence values Cf, Cvo, Cd, Cve, Cw, . . . Cn. The comparison module 332 may increase a partial confidence value as closeness of that piece of received identification data to the corresponding piece of stored identification data associated with that UPID decreases, and vice versa.

Figure 5A:
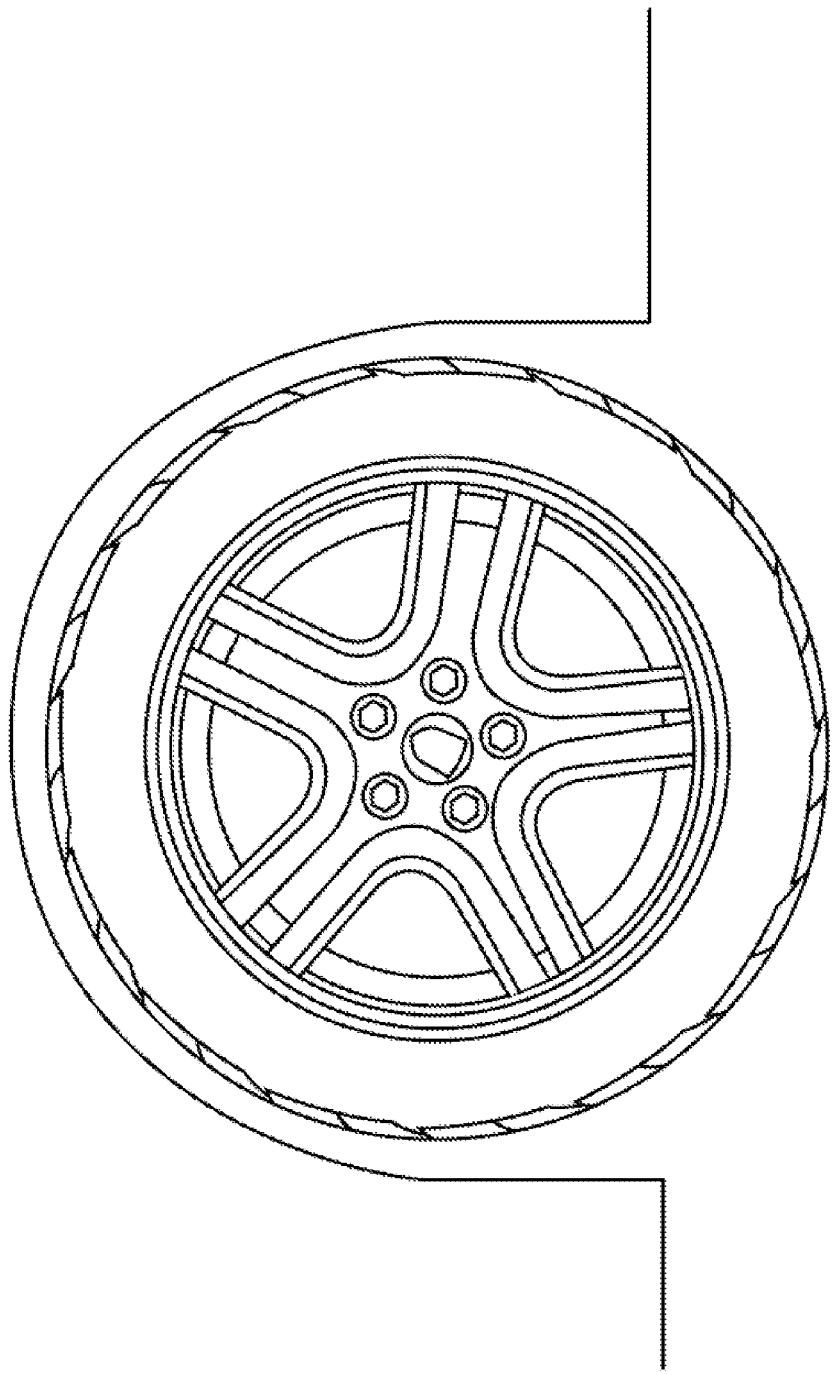
FIG. 5A is an example image of a wheel of a vehicle including an example frame of reference.

For example, the comparison module 332 may calculate the partial confidence value Cw for a UPID based on a comparison of an image of a wheel or a portion of an image including a wheel with stored wheel data. An example image including a wheel is provided in FIG. 5A.

The comparison module 332 may identify a point of reference in an image including a wheel, such as a valve stem. The point of reference and one or more other points (e.g., a center of the wheel) may be used to establish a frame of reference. An example frame of reference has been added to the image in FIG. 5A.

The comparison module 332 may calculate the partial confidence value Cw for a UPID based on a comparison of features in the image of the wheel, relative to the frame of reference, with features in stored wheel data, relative to the same frame of reference in that stored wheel data. For example only, features in the image of the wheel may include tire and/or rim damage, markings (e.g., text or logo) on the tire and/or rim, characteristics of center caps/nuts, number of lug nuts, lug nut location lug nut rotation, and/or one or more other features that may distinguish the wheel from other wheels. The comparison module 332 may identify features, for example, using shape, edge, or another type of feature detection.

Figure 5B:
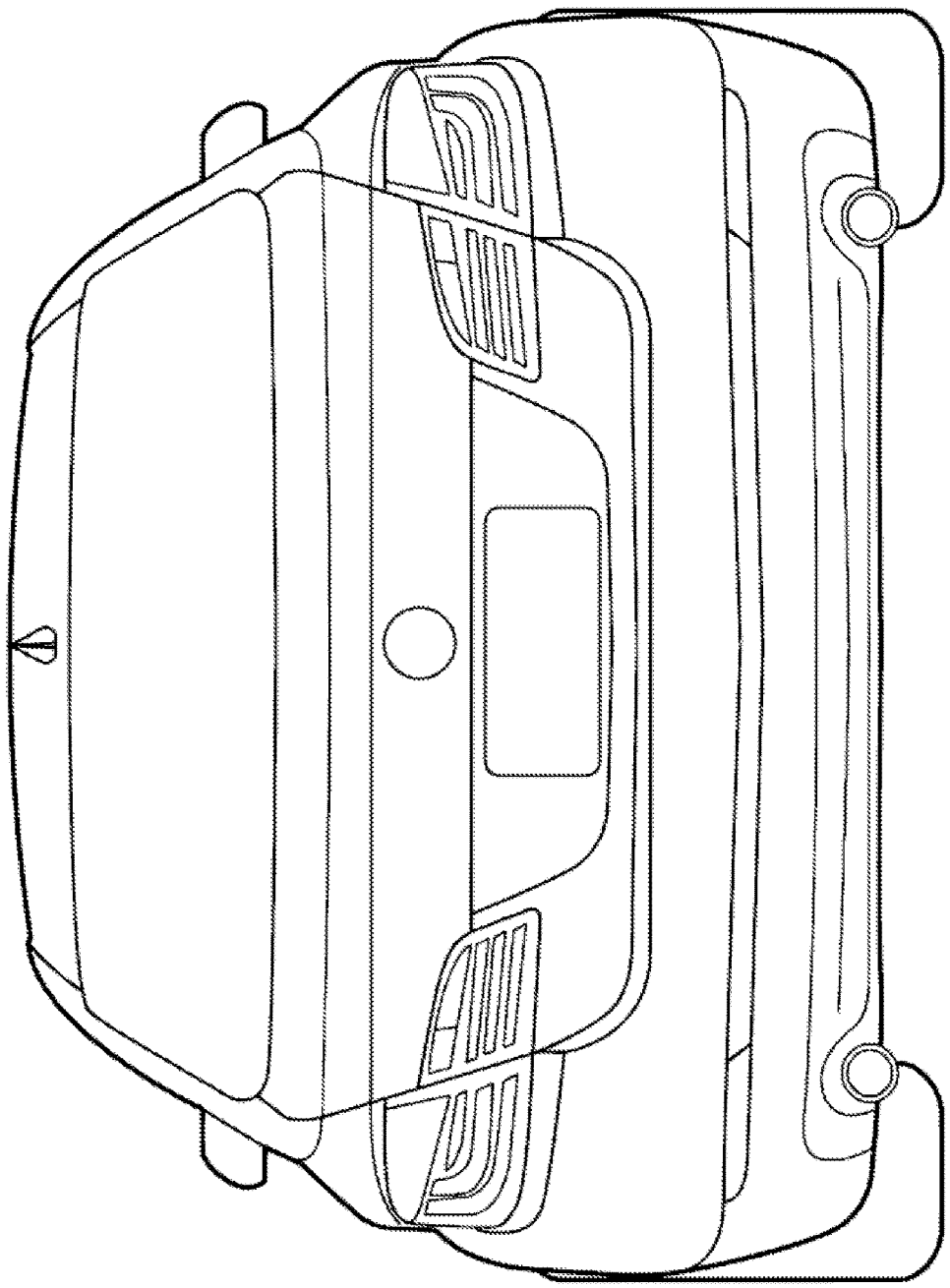
FIG. 5B is an example image of a portion of a vehicle.

For another example only, the comparison module 332 may calculate the partial confidence value Cw for a UPID based on a comparison of an image of a rear end of a vehicle or a portion of an image including a rear end of a vehicle with stored vehicle data. FIG. 5B includes an example image including a rear end of a vehicle.

The comparison module 332 may calculate the partial confidence value Cvw for a UPID based on a comparison of features in the image including the rear end of a vehicle with rear end features in stored vehicle data. For example only, features in the image of the rear end of a vehicle may include light placement, manufacturer emblems, dent/scratches/cracks/etc., exhaust placement, license plate characteristics and associated markings, stickers on the rear end of the vehicle, and other features that may distinguish the rear end of the vehicle from the rear ends of other vehicles. The comparison module 332 may identify features, for example, using shape, edge, or another type of feature detection.

Referring back to FIG. 3, a patron identifier (PID) selection module 320 receives the overall confidence values calculated for the UPIDs, respectively. The PID selection module 320 selects one of the UPIDs based on the overall confidence values. For example, the PID selection module 320 may select the one of the UPIDs for which the highest overall confidence value was calculated.

A profile retrieving module 324 retrieves a profile including data associated with the selected one of the UPIDs ("the selected UPID") from one or more profile tables 328, such as a food preference table, a food allergy table, an order table, and/or one or more other data tables. Each profile table includes the UPIDs, such as UPID1, UPID2, etc. Each profile table also includes profile data that is associated with each UPID. UPIDs and profile data may be added to or updated in the profile tables 328 as patrons place orders using the ordering terminal 200 or one or more other ordering terminals, as discussed further below.

Each UPID has one or more pieces of associated, previously stored profile data. For example, the food preference table may include one or more pieces of data indicating food and/or beverage preferences associated with UPID1. The allergy table may include one or more pieces of data indicating food and/or beverage allergies associated with UPID1. Food and/or beverage may be entered by a user, for example, via the display or via an external computing device. The order table may include one or more pieces of data indicating ordering items that were previously ordered ("previously ordered items") associated with UPID1. As discussed further below, ordering information output to the patron (e.g., displayed on the display 204, output via the speaker 252) by the ordering terminal 200 may be adjusted based on one or more pieces of the profile data.

Figure 6:
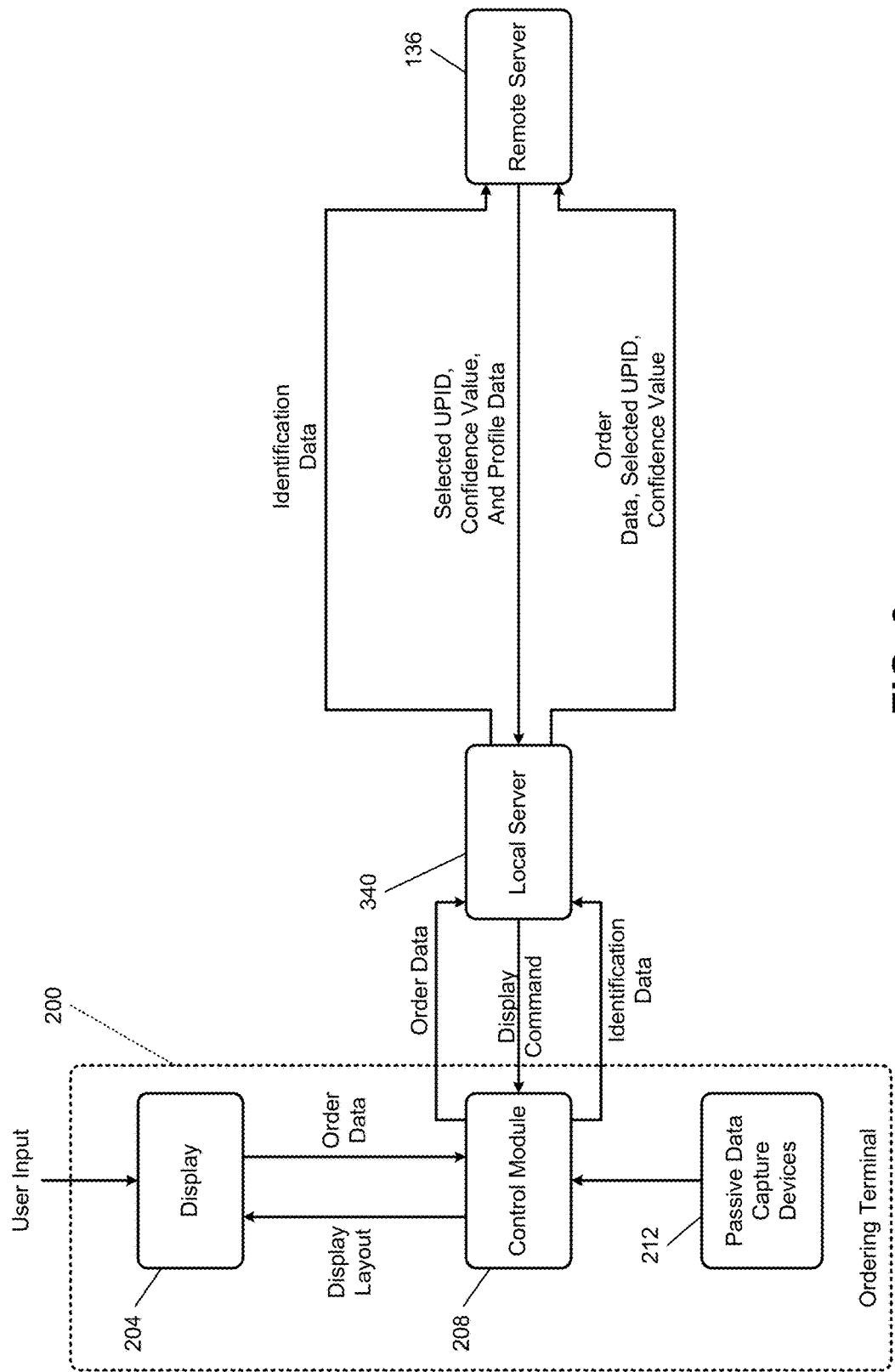
FIG. 6 is a functional block diagram of an example ordering system.

Referring now to FIG. 6, a functional block diagram of an example ordering system is presented. To quickly summarize the above, the ordering terminal 200 captures identification data for a patron detected at the ordering terminal 200. A local server 340 transmits the identification data to the remote server 136. The local server 340 and/or the ordering terminal 200 may process captured identification data before transmission. In various implementations, the ordering terminal 200 may serve as the local server 340.

The remote server 136 calculates the overall confidence values for the UPIDs based on the captured identification data and the stored identification data associated with the UPIDs, respectively. The remote server 136 selects one of the UPIDs based on the overall confidence values, such as the one of the UPIDs having the highest confidence value.

The remote server 136 retrieves profile data associated with the selected UPID, such as food preferences, previously ordered items, allergies, etc. The remote server 136 transmits the selected UPID, the overall confidence value calculated for the selected UPID, and the associated profile data to the local server 340.

Based on the overall confidence value, the local server 340 determines which ordering information to display on the display 204 and how the ordering information should be displayed. The ordering terminal 200 displays ordering information on the display 204 as commanded by the local server 340. In the case of self-service ordering terminals and menu boards, the patron can place an order based on the ordering information presented on the display 204. In the case of a POS terminal, the ordering information displayed can aid an employee in obtaining an order from the patron. While the local server 340 is shown and described as determining and controlling the ordering information that will be output, the ordering terminal 200, the remote server 136, or another device may determine and control the ordering information that will be output by the ordering terminal 200.

A table including example actions that may be taken in the cases of self-service ordering terminals and menu boards is provided below.

| Action | | Explanation |
|---|---|---|
| $0 \leq C < a$ | Take no action. | Confidence level is too low. |
| $a < C < b$ | Shuffle the menu choices based upon the UPID's prior ordering activity. | Confidence level is low, but acceptable for a menu rearrangement. |
| $b < C < c$ | Suggest meal combinations based upon the UPID's prior activity. | Confidence level is medium; meal combinations can be suggested. If this identification is indeed not correct, no harm can be done through this action. |
| $c < C < d$ | Offer discount for repeat UPID | Confidence level is higher. |
| ... | | |
| $x < C \leq 1$ | Welcome patron by name. | Very high confidence level - safe to identify this patron by name. |

For example, when the overall confidence value is greater than 0 and less than a first predetermined value (a), the local server 340 may instruct the ordering terminal 200 to display a predetermined default ordering menu on the display 204. The predetermined default ordering menu includes ordering items located in predetermined locations on the display 204, using predetermined font sizes, predetermined color schemes, etc.

When the overall confidence value is greater than the first predetermined value (a) and less than a second predetermined value (b), the local server 340 may instruct the ordering terminal 200 to display an adjusted ordering menu. The local server 340 may set the adjusted ordering menu, for example, such that one or more previously ordered items (as indicated by the profile data) are highlighted or otherwise emphasized to ease ordering of those ordering items. Additionally or alternatively, the ordering items may be prioritized such that one or more previously ordered items are placed in locations having a higher priority (e.g., top left in countries where reading is performed left to right and top to bottom) on the adjusted ordering menu. Additionally or alternatively, ordering items falling into one or more food/ beverage preferences (as indicated by the profile data) may be highlighted, emphasized, or prioritized relative to other ordering items on the adjusted ordering menu. Additionally or alternatively, ordering items falling into one or more food allergies (as indicated by the profile data) may be de-emphasized, placed on a second ordering menu, placed in locations having lower priority, or removed from the adjusted ordering menu. The second predetermined value (b) is greater than the first predetermined value (a).

When the overall confidence value is greater than the second predetermined value (b) and less than a third predetermined value (c), the local server 340 may instruct the ordering terminal 200 to also display the ordering items of one or more previously placed orders (as indicated by the profile data). The patron can then easily order all or a portion of those ordering items. The third predetermined value (c) is greater than the second predetermined value (b). The ordering items from previously placed orders may be weighted such that ordering items from more recently placed orders are prioritized relative to ordering items from orders placed further back in time.

When the overall confidence value is greater than the third predetermined value (c) and less than a fourth predetermined value (d), in addition to one or more of the display options described above, the local server 340 may instruct the ordering terminal 200 to also indicate a discount or other reward offer to the patron. The fourth predetermined value (d) may be greater than the third predetermined value (c).

When the overall confidence value is greater than a fifth predetermined value (x) and less than or equal to 1, the local server 340 may instruct the ordering terminal 200 to display a name of the patron, which may be stored in the profile data. The name of the patron may be obtained, for example, during a previous order as input by the patron, based on a credit card payment, based on use of the patron's account, or in another manner. However, the name of the patron is not used to select the UPID or to calculate the confidence vales. The fifth predetermined value (x) is greater than the fourth predetermined value (d). The above is a simple example of how the confidence level and the stored profile data can be used at the ordering terminal 200 to improve the patron's experience. Other options for controlling the ordering information displayed to the patron based on the overall confidence value and/or the profile data are possible including taking multiple actions.

When the ordering terminal 200 is displaying an ordering menu other than the predetermined default ordering menu, the ordering terminal 200 may display a patron selectable option to prompt the ordering terminal 200 to display the predetermined default ordering menu. This enables the patron to use the predetermined default ordering menu if desired, such as to order an ordering item that has been removed from the ordering menu based on the profile data or that the patron cannot find on the ordering menu.

In the case of a POS terminal, the local server 340 instructs the ordering terminal 200 what to display based on the overall confidence value. In addition to the display for the employee, a POS terminal may include a display that faces the area where patrons approach the POS terminal. The local server 340 may instruct the ordering terminal 200 to display predetermined default information when the overall confidence value is low. When the overall confidence value is higher, the local server 340 may command the ordering terminal 200 to display information to the employee based on the profile data to aid in conversational ordering. For example, the local server 340 may command the ordering terminal 200 to display a name of the patron and to display an instruction to ask the patron by name if they would like one or more previously ordered items.

The ordering terminal 200 may transmit order data indicative of an order placed by the patron to the local server 340, and the local server 340 may transmit the order data to the remote server 136. In the case of a menu board, the order may be input by an employee at a different ordering terminal (a POS terminal).

Referring back to FIG. 3, an updating module 350 may update the identification table 308 and one or more of the profile tables 328 based on the order data. For example, when the overall confidence value calculated for the selected UPID is less than a sixth predetermined value, the updating module 350 may create a new UPID in the identification table 308 and store the captured identification data in association with the new UPID. The updating module 350 may also add the new UPID to the profile tables 328 and store the order data in association with the new UPID.

When the overall confidence value for the calculated one of the UPIDs is greater than the sixth predetermined value and less than a seventh predetermined value, the updating module 350 may add to or modify the captured identification stored in association with the selected UPID in the identification table 308. The addition may include storing types of captured identification data that was previously not stored for the selected UPID. The modification may include, for example, adding the captured identification data to stored identification data associated with the selected UPID. Additionally or alternatively, the modification may include, for example, selectively adjusting stored identification data based on the captured identification data to improve the likelihood of association of the patron with the selected UPID in the future. The updating module 350 may also store the order data in association with the selected UPID.

When the overall confidence value is greater than the sixth predetermined value and order data from one or more previous orders is stored for the selected one of the UPIDs, the updating module 350 may also determine one or more food and/or beverage preferences and/or allergies based on the order data and the stored order data. Allergy data may also be provided, for example, by the patron via an ordering terminal or via another computing device. The updating module 350 may update the stored food preference data and/or the stored allergy data associated with the selected one of the UPIDs accordingly.

Figure 7:
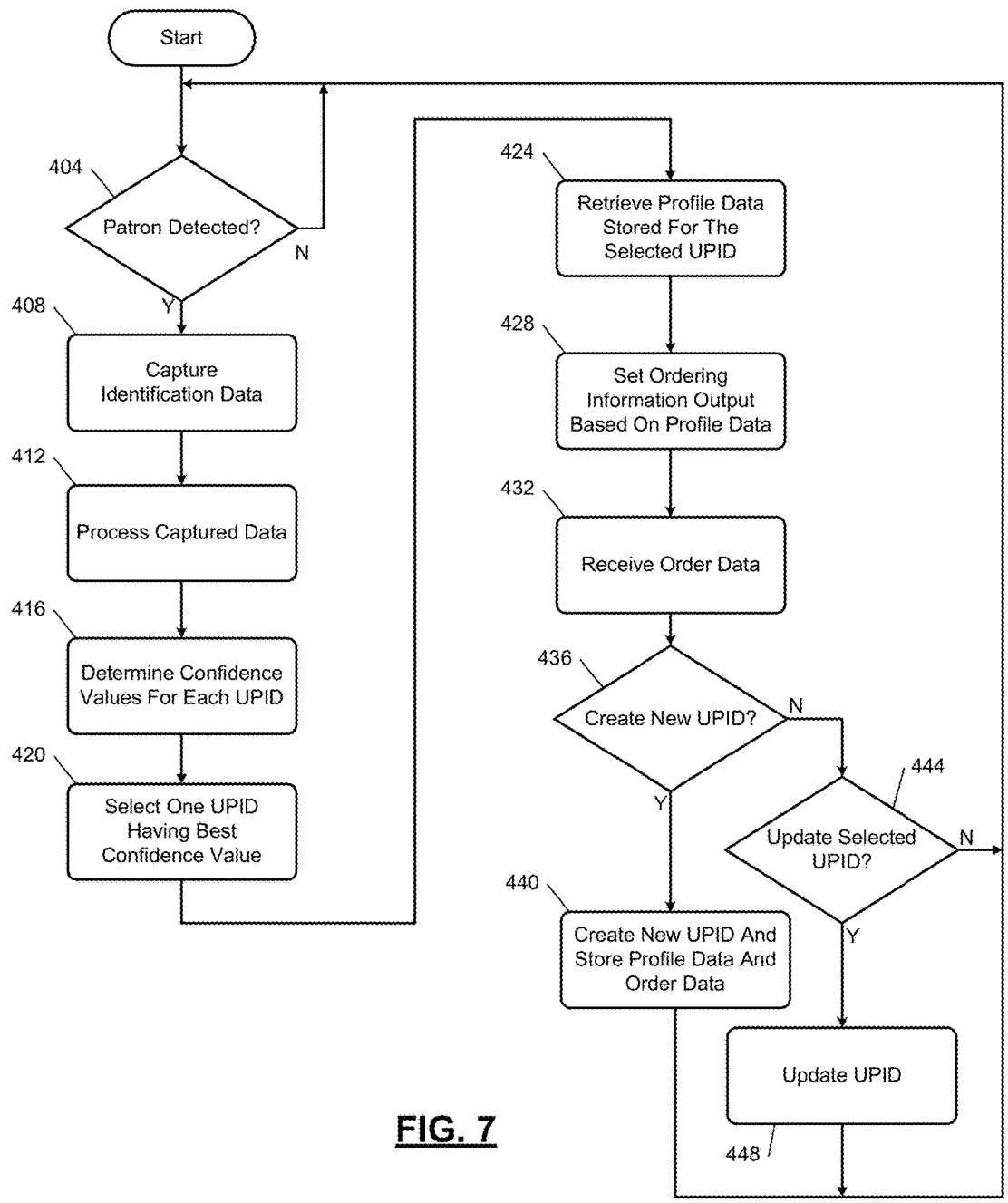
FIG. 7 is a flowchart depicting an example method including controlling ordering information output to a patron at an ordering terminal.

FIG. 7 is a flowchart depicting an example method including controlling ordering information output to a patron at an ordering terminal. Referring now to FIG. 7, control may begin with 404 where control determines whether a patron is at or approaching the ordering terminal 200. Patrons may be detected, for example, using motion, proximity, or other types of sensing. If 404 is true, control continues with 408. If 404 is false, control remains at 404.

At 408, identification data for the patron is captured using the passive data capture devices 212. For example, one or more of the following may be captured: one or more unique identifiers of an electronic devices; one or more images of the face of the patron; audio based on speech of the patron; one or more images of the patron's vehicle; one or more images of one or more wheels of the patron's vehicle; and/or data indicative of a paint formulation of the patron's vehicle.

One or more sets of the captured identification data may be processed at 412, for example, to reduce the period necessary for transmission. Overall confidence values for the UPIDs are calculated at 416. The overall confidence value for a given one of the UPIDs is calculated based on comparisons of the captured identification data with stored identification data associated with that one of the UPIDs. The overall confidence value of a given one of the UPIDs may increase as closeness between captured identification data and stored identification data associated with that UPID increases, and vice versa. Calculation of partial and overall confidence values is discussed above.

At 420, one of the UPIDs is selected based on the overall confidence values. For example, the one of the UPIDs having the highest confidence value may be selected at 420.

The profile data associated with the selected UPID is retrieved from the profile tables 328 at 424. The profile data may include, for example, one or more previously placed orders associated with the selected UPID, one or more food and/or beverage preferences associated with the selected UPID, one or more food and/or beverage allergies associated with the selected UPID, and/or other data associated with the UPID during one or more previous orders.

At 428, how to display ordering information to the patron on the display 204 of the ordering terminal 200 is determined based at least partially on the overall confidence value of the selected UPID. For example, the local server 340 may command the ordering terminal 200 to display the predetermined default ordering menu when the overall confidence value is less than the first predetermined value.

When the overall confidence value is greater than the first predetermined value and less than the second predetermined value, the local server 340 may command the ordering terminal 200 to display an adjusted ordering menu. The local server 340 may set the adjusted ordering menu, for example, such that one or more ordering items that the patron has previously ordered are highlighted or otherwise emphasized to ease ordering of those ordering items. Previously ordered items are indicated in the profile data. Additionally or alternatively, the ordering items may be prioritized such that one or more previously ordered items are placed in locations having a higher priority (e.g., top left in countries where reading is performed left to right and top to bottom) on the adjusted ordering menu. Additionally or alternatively, ordering items falling into one or more food/beverage preferences (as indicated by the profile data) may be highlighted, emphasized, or prioritized relative to other ordering items on the adjusted ordering menu. Additionally or alternatively, ordering items falling into one or more food allergies (as indicated by the profile data) may be de-emphasized, placed on a second ordering menu, placed in locations having lower priority, or removed from the adjusted ordering menu. The second predetermined value is greater than the first predetermined value.

When the overall confidence value is greater than the second predetermined value and less than the third predetermined value, the local server 340 may command the ordering terminal 200 to display the ordering items of one or more previously placed orders (as indicated by the profile data). When the overall confidence value is greater than the third predetermined value and less than the fourth predetermined value, in addition to one or more of the display options described above, the local server 340 may instruct the ordering terminal 200 to indicate a discount offer to the patron. When the overall confidence value is greater than the fifth predetermined value, the local server 340 may command the ordering terminal 200 to display a name of the patron, which may be stored in the profile data.

At 432, ordering data is received indicating the items ordered by the patron. Additional data may also be captured and received, such as additional face images of the patron captured while the patron orders. For example, the ordering terminal 200 may capture a face image of the patron each time the patron touches the display 204 of self-service ordering terminals.

Whether to create a new UPID may be determined at 436. If 436 is true, control continues with 440. If 436 is false, control continues with 444. For example, control may determine to create a new UPID when the overall confidence value calculated for the selected UPID is less than the sixth predetermined value. The new UPID is added to the identification table 308 and the profile tables 328 at 440. Also at 440, the captured identification data and the received order data is stored association with the new UPID.

At 444, a determination may be made as to whether to update the selected one of the UPIDs. If 444 is true, control continues with 448. If 444 is false, control may return to 404. For example, the selected one of the UPIDs may be updated at 448 when the overall confidence value calculated for the selected one of the UPIDs is greater than the sixth predetermined value and less than the seventh predetermined value. The updating at 448 may include storing types of captured identification data that was previously not stored for the selected one of the UPIDs, storing additional pieces of captured identification data in association with the selected one of the UPIDs, and/or selectively adjusting stored identification data based on the captured identification data. This may improve the likelihood of association of the patron with the selected one of the UPIDs in the future.

When the overall confidence value is greater than the sixth predetermined value and order data from one or more previous orders is stored for the selected one of the UPIDs, the updating module 350 may also determine one or more food and/or beverage preferences and/or allergies based on the order data and the stored order data. Control may return to 404 for a next patron. While the determinations of whether to create a new UPID and whether to update an existing UPID are discussed as being performed after receipt of the order data, these determinations and storing of captured identification data may be performed before 432, such as after 420 and before 424.

Referring back to FIG. 3, a monitoring module 380 may be implemented to monitor the stored identification data. Each time captured identification data is stored in association with a UPID, the captured identification data may be tagged with a unique order identifier.

The monitoring module 380 may identify UPIDs that include stored identification data having two or more different order identifiers. For a UPID that includes stored identification data having two or more different order identifiers, the monitoring module 380 may compare the pieces of stored identification data to determine whether the stored identification data was captured based on two different patrons. For example, the monitoring module 380 may compare a first piece of stored face data for UPID1 having an order identifier with a second piece of stored face data for UPID1 having a different order identifier. The monitoring module 380 may perform the comparison for one, multiple, or all pieces of the same type of stored identification data. When the pieces of stored identification data are sufficiently different, the monitoring module 380 may create a new UPID and transfer the stored identification data associated with one of the order identifiers to the new UPID.

Additionally or alternatively, the monitoring module 380 may compare the pieces of stored identification data from different UPIDs with each other to determine whether the stored identification data from the two different UPIDs was captured based on the same patron. For example, the monitoring module 380 may compare a first piece of stored face data associated with UPID1 with a second piece of stored face data associated with UPID2. The monitoring module 380 may perform the comparison for one, multiple, or all pieces of the same type of stored identification data. If the stored identification data associated with UPID1 is sufficiently similar to the stored identification data associated with UPID2, the monitoring module 380 may associate all of the stored identification data with one of the UPIDs (UPID1 or UPID2) and delete the other one of the UPIDs. The monitoring module 380 may operate at times when ordering terminals are operational, at times of low traffic from ordering terminals, or at times when ordering terminals are non-operational.

Figure 8:
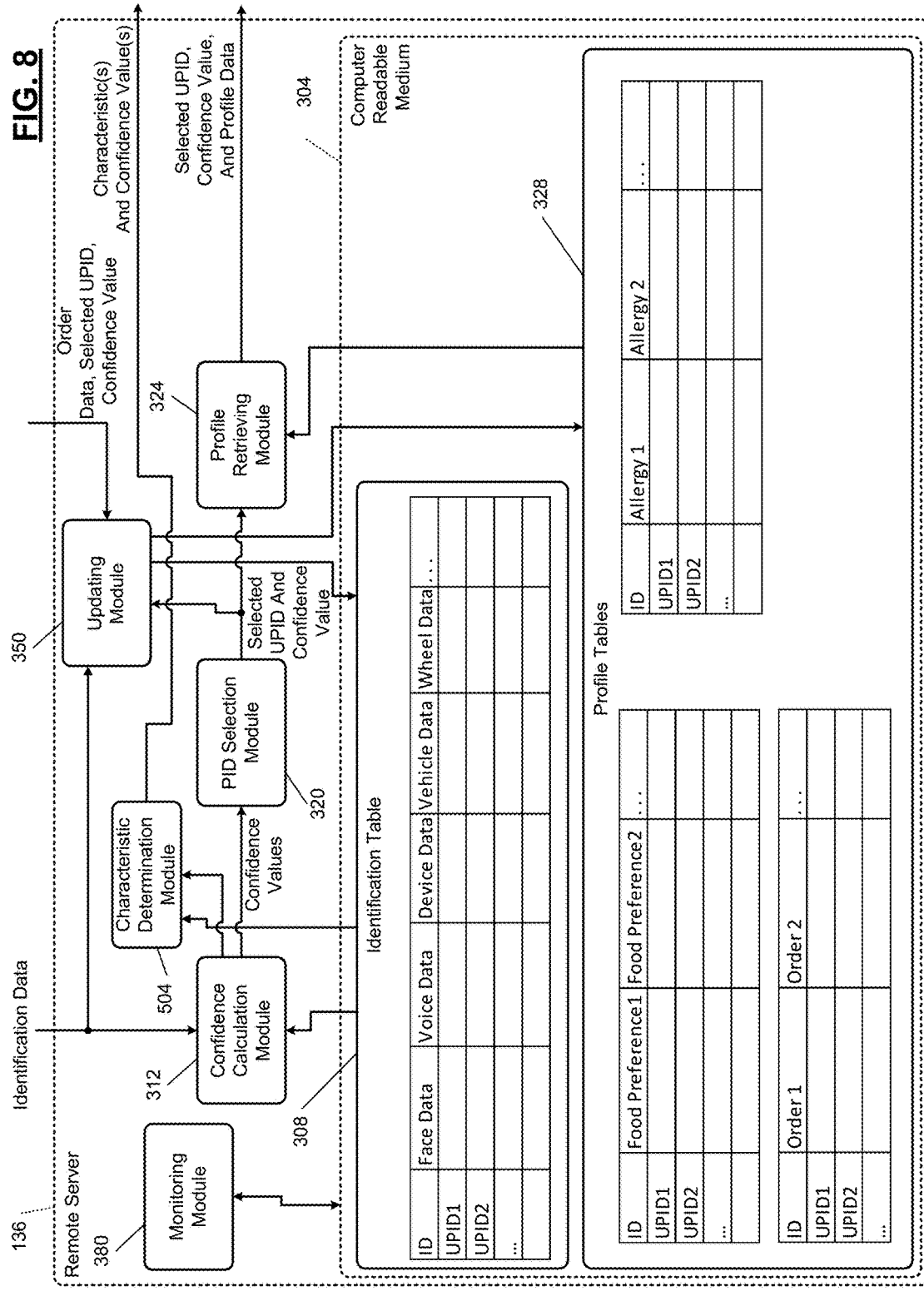
FIG. 8 is a functional block diagram of an example implementation of an identification server.

Referring now to FIG. 8, the identification table 308 may also include one or more UPIDs created for general characteristics of patrons. For example, the identification table 308 may include a UPID created for male patrons, a UPID created for female patrons, a UPID created for larger patrons, a UPID created for smaller patrons, a UPID created for older patrons, a UPID created for middle aged patrons, a UPID created for younger patrons, and UPIDs created for patrons speaking different languages.

The UPIDs created for general characteristics have associated predetermined identification data for identifying patrons satisfying that general characteristic. For example, a UPID created for male patrons may include predetermined face data for recognizing male patrons as being male and predetermined voice data for recognizing male patrons as being male. A UPID created for female patrons may include predetermined face data for recognizing female patrons as being female and predetermined voice data for recognizing female patrons as being female. A UPID created for larger patrons may include predetermined face data for recognizing larger patrons as being relatively large. A UPID created for smaller patrons may include predetermined face data for recognizing smaller patrons as being relatively small.

A UPID created for older patrons may include predetermined face data for recognizing older patrons as being older relative to middle aged and younger patrons and predetermined voice data for recognizing older patrons as being older relative to middle aged and younger patrons. A UPID created for middle-aged patrons may include predetermined face data for recognizing middle-aged patrons as being middle-aged relative to older and younger patrons and predetermined voice data for recognizing middle-aged patrons as being middle-aged relative to older and younger patrons. A UPID created for younger patrons may include predetermined face data for recognizing younger patrons as being younger relative to older and middle-aged patrons and predetermined voice data for recognizing younger patrons as being younger relative to older and middle-aged patrons. A UPID created for patrons speaking a specific language may include predetermined voice data for recognizing patrons speaking that language.

The confidence calculation module 312 calculates the overall confidence values for the UPIDs created for general characteristics, respectively, as described above. A characteristic determination module 504 determines one or more general characteristics of a patron present at the ordering terminal 200 based on the overall confidence values for the UPIDs created for general characteristics.

For example, the characteristic determination module 504 may determine that the patron at the ordering terminal 200 is male when the overall confidence value for the UPID created for male patrons is greater than an eighth predetermined value. The characteristic determination module 504 may determine that the patron at the ordering terminal 200 is female when the overall confidence value for the UPID created for female patrons is greater than a ninth predetermined value. The characteristic determination module 504 may determine that the patron at the ordering terminal 200 is relatively large when the overall confidence value for the UPID created for larger patrons is greater than a tenth predetermined value. The characteristic determination module 504 may determine that the patron at the ordering terminal 200 is relatively small when the overall confidence value for the UPID created for smaller patrons is greater than an eleventh predetermined value.

The characteristic determination module 504 may determine that the patron at the ordering terminal 200 is older when the overall confidence value for the UPID created for older patrons is greater than a twelfth predetermined value. The characteristic determination module 504 may determine that the patron at the ordering terminal 200 is middle-aged when the overall confidence value for the UPID created for middle-aged patrons is greater than a thirteenth predetermined value. The characteristic determination module 504 may determine that the patron at the ordering terminal 200 is younger when the overall confidence value for the UPID created for younger patrons is greater than a fourteenth predetermined value. The characteristic determination module 504 may determine that the patron at the ordering terminal 200 speaks a language when the overall confidence value for the UPID created patrons speaking that language is greater than a fifteenth predetermined value.

Figure 9:
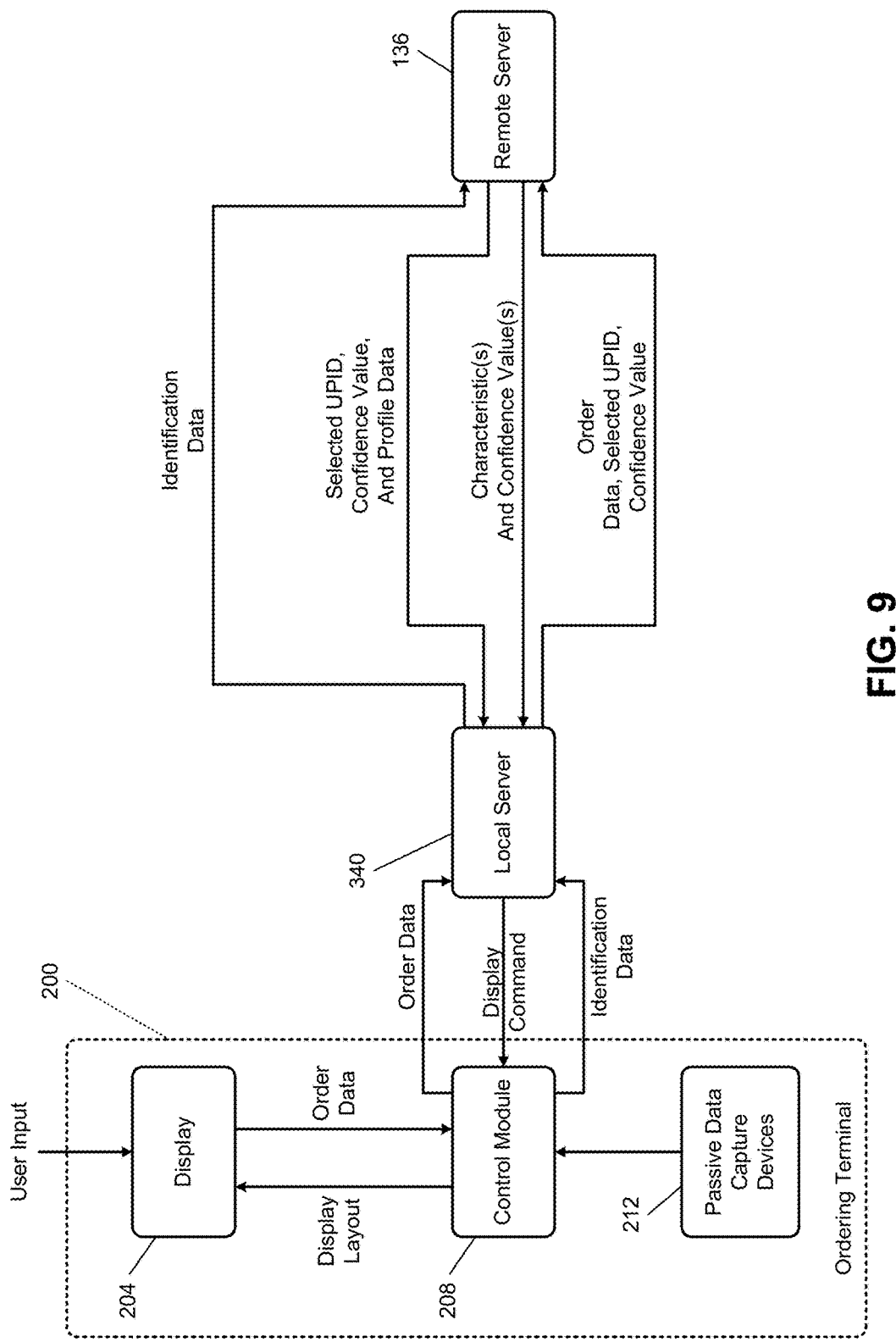
FIG. 9 is a functional block diagram of an example ordering system.

Referring now to FIG. 9, another functional block diagram of an example ordering system is presented. The ordering information displayed to the patron and/or one or more other characteristics of the ordering terminal 200 may be set additionally or alternatively based on one or more general characteristics. For example only, colors displayed, language used, font size, volume of audio output, brightness, and/or one or more other parameters of the ordering terminal 200 may be set based on one or more of the general characteristics.

For example only, when the overall confidence value calculated for younger patrons is greater than a sixteenth predetermined value, the local server 340 may command the ordering terminal 200 to display pastel or brighter colors selected for younger patrons. When the overall confidence value calculated for younger patrons is greater than a seventeenth predetermined value, the local server 340 may command the ordering terminal 200 to display an adjusted ordering menu having food and beverage choices selected for younger patrons. When the overall confidence value calculated for middle-aged patrons is greater than an eighteenth predetermined value, the local server 340 may command the ordering terminal 200 to display an adjusted ordering menu having food and beverage choices selected for middle-aged patrons.

When the overall confidence value calculated for older-aged patrons is greater than a nineteenth predetermined value, the local server 340 may command the ordering terminal 200 to display an adjusted ordering menu having food and beverage choices selected for older patrons. Additionally or alternatively, when the overall confidence value calculated for older-aged patrons is greater than a twentieth predetermined value, the local server 340 may command the ordering terminal 200 to display ordering items using larger font sizes, to increase a brightness of the display 204, and/or to increase the volume of audio output.

When the overall confidence value calculated for larger patrons is greater than a twenty-first predetermined value, the local server 340 may command the ordering terminal 200 to display an adjusted ordering menu having food and beverage choices selected for larger patrons. When the overall confidence value calculated for smaller patrons is greater than a twenty-second predetermined value, the local server 340 may command the ordering terminal 200 to display an adjusted ordering menu having food and beverage choices selected for smaller patrons.

When the overall confidence value calculated for patrons speaking a specific language is greater than a twenty-third predetermined value, the local server 340 may command the ordering terminal 200 to output information in that language. The local server 340 may also command the ordering terminal 200 to display an adjusted ordering menu selected for patrons speaking that language or more prominently display ordering options in that language.

Figure 10:
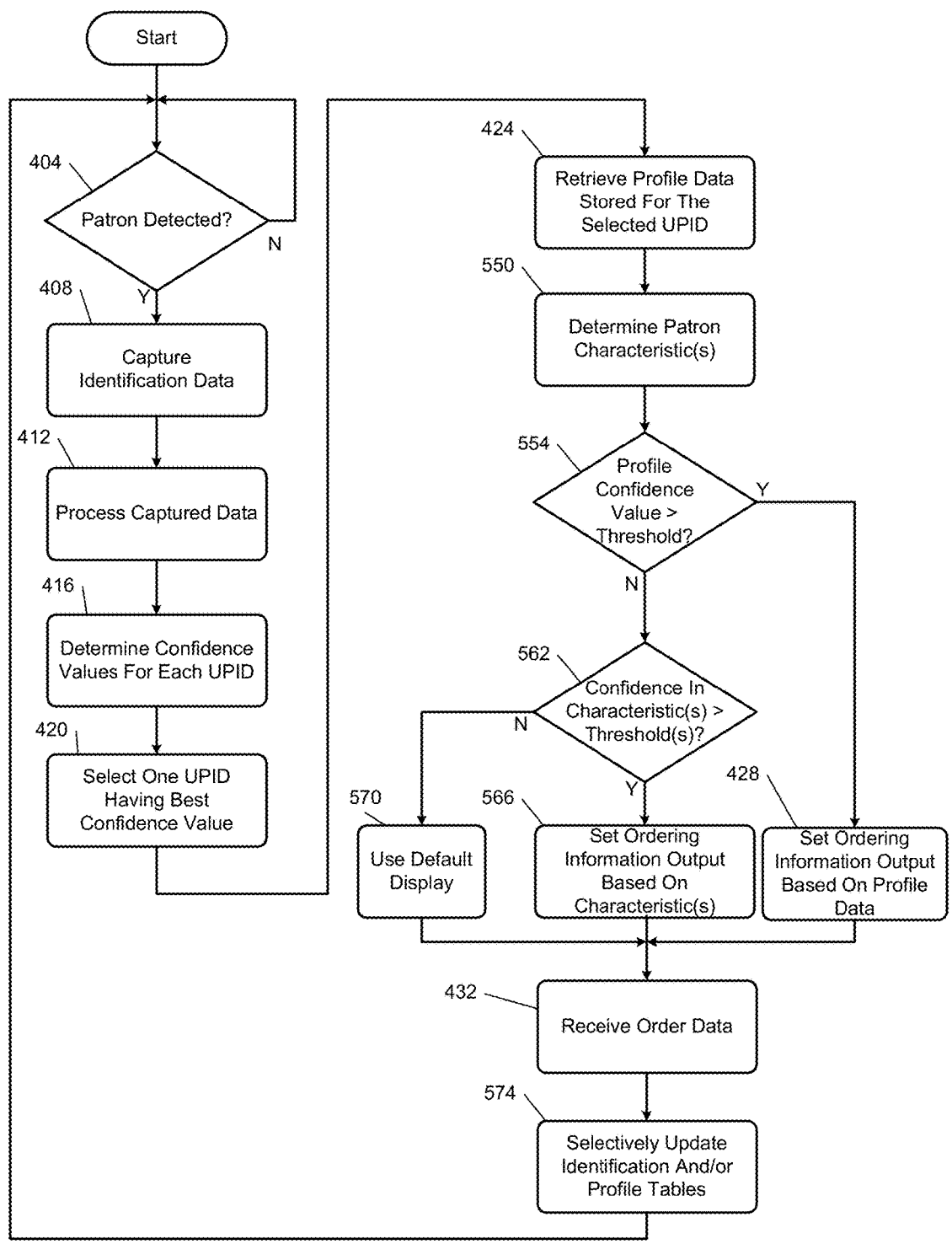
FIG. 10 is a flowchart depicting an example method including controlling ordering information output to a patron at an ordering terminal.

FIG. 10 is a flowchart depicting another example method including controlling ordering information output to a patron at an ordering terminal. Referring now to FIG. 10, control may begin with 404-424, as described above. Control may continue with 550 where a determination is made as to whether the patron at the ordering terminal 200 satisfies one or more of the general characteristics. For example, the characteristic determination module 504 may determine that the patron satisfies a general characteristic (e.g., male, female, larger, smaller, older, middle-aged, younger, etc.) when the overall confidence value calculated for the UPID for that general characteristic is greater than a corresponding predetermined value.

At 554, a determination is made as to whether the overall confidence value associated with the selected UPID is greater than the first predetermined value. If 554 is true, control continues with 428, which is discussed above, and control may continue with 432, which is also discussed above. While control is shown and discussed as continuing with 432 after 428, control may instead continue with 562, which is discussed further below. If 554 is false, control continues with 562.

At 562, a determination is made as to whether the overall confidence value(s) associated with the general characteristic(s) of the patron are greater than corresponding predetermined values. If 562 is true, control may continue with 566. If 562 is false, the local server 340 may command the ordering terminal 200 to display the predetermined default ordering menu at 570, and control may continue with 432, which is discussed above.

At 566, a determination is made as to how to output ordering information to the patron via the ordering terminal 200 based on the general characteristic(s) of the patron. For example only, colors displayed, language used, font size, volume of audio output, brightness, and/or one or more other parameters of the ordering terminal 200 may be set based on one or more of the general characteristics.

For example only, the local server 340 may command the ordering terminal 200 to display pastel or brighter colors for younger patrons and/or display an adjusted ordering menu having food and beverage choices selected for younger patrons. The local server 340 may command the ordering terminal 200 to display an adjusted ordering menu having food and beverage choices selected for middle-aged patrons. The local server 340 may command the ordering terminal 200 to display an adjusted ordering menu having food and beverage choices selected for older patrons. Additionally or alternatively, the local server 340 may command the ordering terminal 200 to display ordering items using larger font sizes, to increase a brightness of the display 204, and/or to output any audio in a louder fashion for older patrons. The local server 340 may command the ordering terminal 200 to display an adjusted ordering menu having food and beverage choices selected for larger patrons. The local server 340 may command the ordering terminal 200 to display an adjusted ordering menu having food and beverage choices selected for smaller patrons. The local server 340 may command the ordering terminal 200 to output ordering information in a language determined for the patron and/or display an adjusted ordering menu having food and beverage choices selected for patrons speaking that language. By adjusting the ordering experience based on one or more general characteristics of the patron, the ordering experience may be enhanced for first-time patrons for which associated identification data has not previously been captured.

At 574, the identification table 308 and one or more of the profile tables 328 are selectively updated. For example, when the overall confidence value calculated for the selected UPID is less than a sixth predetermined value, the updating module 350 may create a new UPID in the identification table 308 and store the captured identification data in association with the new UPID. The updating module 350 may also add the new UPID to the profile tables 328 and store the order data in association with the new UPID.

When the overall confidence value for the calculated one of the UPIDs is greater than the sixth predetermined value and less than a seventh predetermined value, the updating module 350 may add to or modify the captured identification stored in association with the selected UPID in the identification table 308. The addition may include storing types of captured identification data that was previously not stored for the selected UPID. The modification may include, for example, adding the captured identification data to stored identification data associated with the selected UPID. Additionally or alternatively, the modification may include, for example, selectively adjusting stored identification data based on the captured identification data to improve the likelihood of association of the patron with the selected UPID in the future. The updating module 350 may also store the order data in association with the selected UPID.

When the overall confidence value is greater than the sixth predetermined value and order data from one or more previous orders is stored for the selected one of the UPIDs, the updating module 350 may also determine one or more food and/or beverage preferences and/or allergies based on the order data and the stored order data. Allergy data may also be provided, for example, by the patron via an ordering terminal. The updating module 350 may update the stored food preference data and/or the stored allergy data associated with the selected one of the UPIDs accordingly. While 574 is shown, 574 may include functions similar to those of 436-448, as discussed above. Also, the updating of one or more of the profile tables 328 may be done, for example, between 420 and 424.

Figure 11:
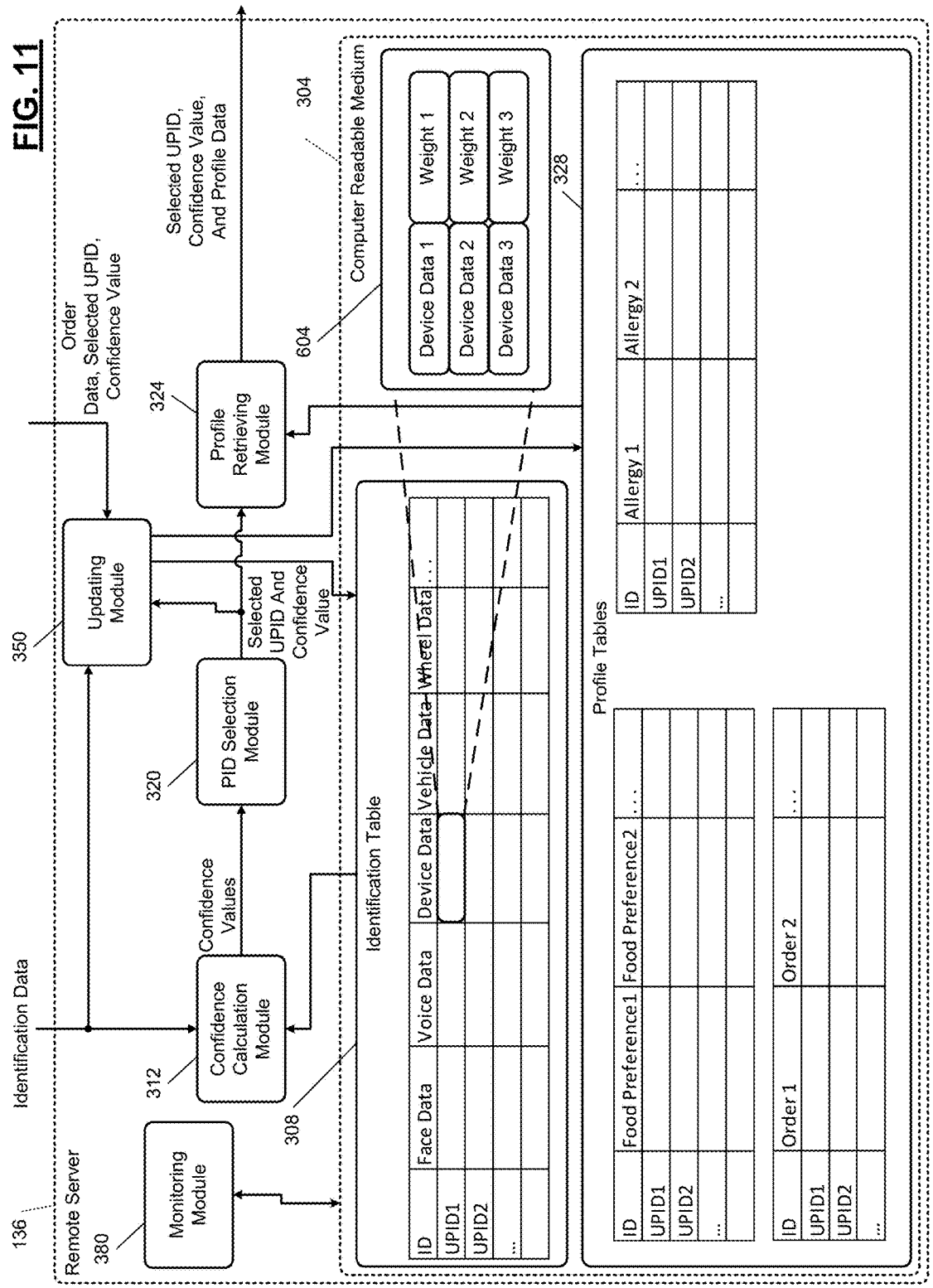
FIG. 11 is a functional block diagram of an example implementation of an identification server.

Referring now to FIG. 11, some types of unique identifiers of electronic devices, such as Bluetooth identifiers, may be transmitted over longer ranges. As such, the control module 208 may receive two or more unique identifiers of electronic devices when a patron is detected at the ordering terminal 200. These electronic devices may be the patron's or others in the patron's group. However, these electronic devices may also be of other patrons, employees, and others.

The control module 208 may therefore generate the identification data to include multiple unique identifiers of multiple electronic devices, and multiple unique identifiers may be stored in the identification table 308 in association with a UPID. If multiple of the same type of unique identifiers are received, the one unique identifier having a highest signal strength may be used.

For example, in the example of FIG. 11, three different unique identifiers (device data 1, device data 2, and device data 3) associated with three different electronic devices, respectively, are stored with UPID1. This is illustrated by 604. Each of the stored unique identifiers may have an associated weighting value. For example, device data 1 is associated with weight 1, device data 2 is associated with weight 2, and device data 3 is associated with weight 3. The weighting values may initially be set to a predetermined value when a new unique identifier of an electronic device is stored in association with a UPID. However, the monitoring module 380 may adjust one or more of the weighting values, for example, as discussed further below.

For the situation where a UPID includes multiple pieces of device data and/or the identification data includes multiple unique device identifiers, confidence calculation module 312 may compare each unique device identifier included in the identification data with each piece of device data stored for a UPID to determine the final confidence value for that UPID. For example, the (1−Wd*Cd) portion of the above equation may be expanded to:

$$(1-Wd*Wd_1*Cd_{1,1})* \ldots *(1-Wd*Wd_Q*Cd_{Q,R}),$$

where Wd is the weighting factor associated with the extent to which the comparison of received device data with stored device data should affect the overall confidence values, $Wd_1$ is a weighting factor associated with a first piece of stored device data for a UPID, $Cd_{1,1}$ is a partial confidence value between 0 and 1 calculated by the comparison module 332 based on a comparison of the first piece of stored device data for the UPID with a first piece of device data included in the identification data. Q is an integer greater than or equal to 1 that is equal to the number of pieces of stored device data for the UPID, and R is an integer greater than or equal to 1 that is equal to the number of pieces of device data included in the identification data. $Wd_Q$ is a weighting factor associated with a Q-th piece of stored device data for the UPID, $Cd_{Q,R}$ is a partial confidence value between 0 and 1 calculated by the comparison module 332 based on a comparison of the Q-th piece of stored device data for the UPID with an R-th piece of device data included in the identification data.

The above equation can therefore be re-written as:

$$C1=1-[(1-Wf*Cf)*(1-Wvo*Cvo)*(1-Wd*Wd_1*Cd_{1,1})* \ldots *(1-Wd*Wd_Q*Cd_{Q,R})*(1-Wve*Cve)*(1-Ww*Cw)* \ldots *(1-Wn*Cn)].$$

The monitoring module 380 may selectively adjust the weighting factors associated with stored device data. For example, when a (one) electronic device identifier is associated with more than a predetermined number of different UPIDs, the monitoring module 380 may decrease (including to zero) the weighting factors associated with that electronic device identifier in one, multiple, or all of the UPIDs. This may be the case, for example, for the electronic device identifier of an employee.

When an electronic device identifier associated with a UPID is not included with multiple electronic devices in the identification data, the monitoring module 380 may decrease the weighting factor associated with that electronic device identifier in the UPID. This may be the case, for example, when an electronic device is near the ordering terminal 200 during an earlier visit of a patron but not near the ordering terminal 200 when the patron later visits. Conversely, when an electronic device identifier associated with a UPID is included with multiple electronic devices in the identification data, the monitoring module 380 may increase the weighting factor associated with that electronic device identifier in the UPID. While the above examples of adjusting the weighting factors have been provided, the monitoring module 380 may additionally or alternatively adjust the weighting factors associated with stored device data in other ways and/or for other reasons.

Figure 12:
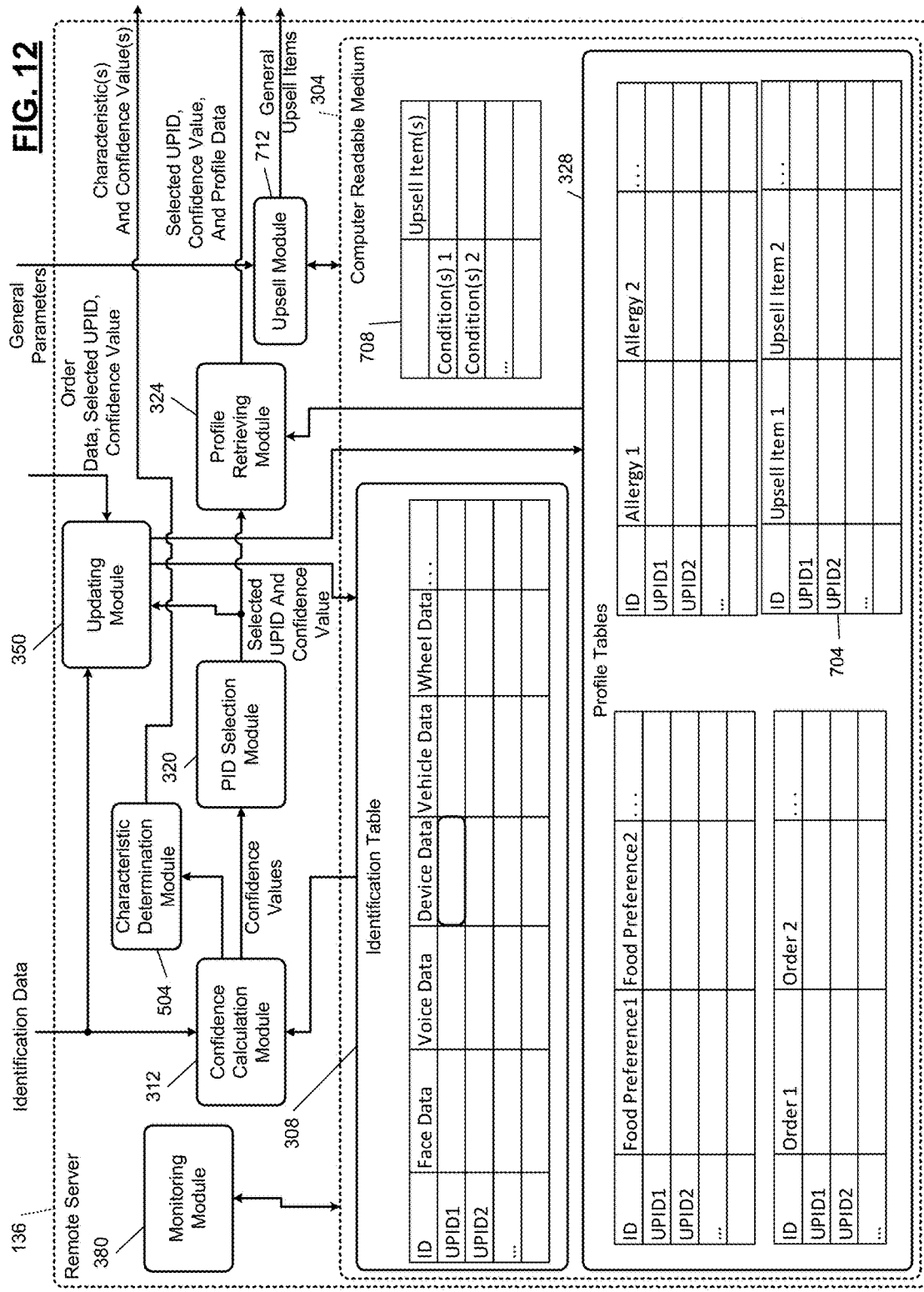
FIG. 12 is a functional block diagram of an example remote server.

Referring now to FIG. 12, the profile tables 328 may also include an upsell table 704. The upsell table 704 includes the UPIDs, such as UPID1, UPID2, etc. The UPIDs may be for individual patrons or general characteristics, as discussed above. The upsell table 704 also includes one or more ordering items that can be presented to the respective patrons or patrons having the respective general characteristics in an effort to sell or to upsell those ordering items. These ordering items will be referred to as upsell items.

A general upsell table 708 may also be stored. The general upsell table 708 may include one or more upsell items that can be subliminally presented to any patron when one or more associated conditions are satisfied. These upsell items can be subliminally presented, for example, for patrons that do not sufficiently correlate to one or more of the patron UPIDs and that do not sufficiently correlate to one or more of the general characteristic UPIDs.

For example, the general upsell table 708 may include one or more upsell items that can be subliminally suggested to patrons during predetermined date ranges during each year. By way of example, warm beverages (e.g., coffee, hot tea, hot cocoa, etc.) may be subliminally presented to patrons between dates when weather conditions are typically colder at the location of the ordering terminal 200. In this example, the warm beverages are the upsell items, and dates for colder weather conditions are the conditions to be assessed.

Another example is cold items (e.g., ice cream items, milkshakes, smoothies, etc.) may be subliminally suggested to patrons between dates when weather conditions are typically warmer at the location of the ordering terminal 200. In this example, the cold items are the upsell items, and dates for warmer weather conditions are the conditions to be assessed. Another example is that coffee, hot tea, espresso, and/or other warm beverages may be subliminally presented to patrons between morning times (e.g., 5 am-11 am). While only the above examples of upsell items and conditions have been provided, other suitable upsell items and corresponding conditions are possible. Other conditions that may be associated with upsell items may include, but are not limited to, temperature at the ordering terminal 200, weather conditions at the ordering terminal 200, and lighting conditions at the ordering terminal 200. The upsell items and the corresponding conditions are stored in the upsell table 708.

An upsell module 712 determines whether present conditions at the ordering terminal 200 satisfy one or more of the conditions of the general upsell table 708. For example, the upsell module 712 may determine whether the present date satisfies any predetermined date ranges stored in the general upsell table 708. Additionally or alternatively, the upsell module 712 may determine whether the present time (of day) at the ordering terminal 200 is within predetermined time ranges stored in the general upsell table 708. Additionally or alternatively, the upsell module 712 may determine whether a present temperature at the ordering terminal 200 is within predetermined temperature ranges stored in the upsell table 708. Additionally or alternatively, the upsell module 712 may determine whether present weather conditions at the ordering terminal 200 satisfy predetermined weather conditions stored in the upsell table 708.

Figure 13:
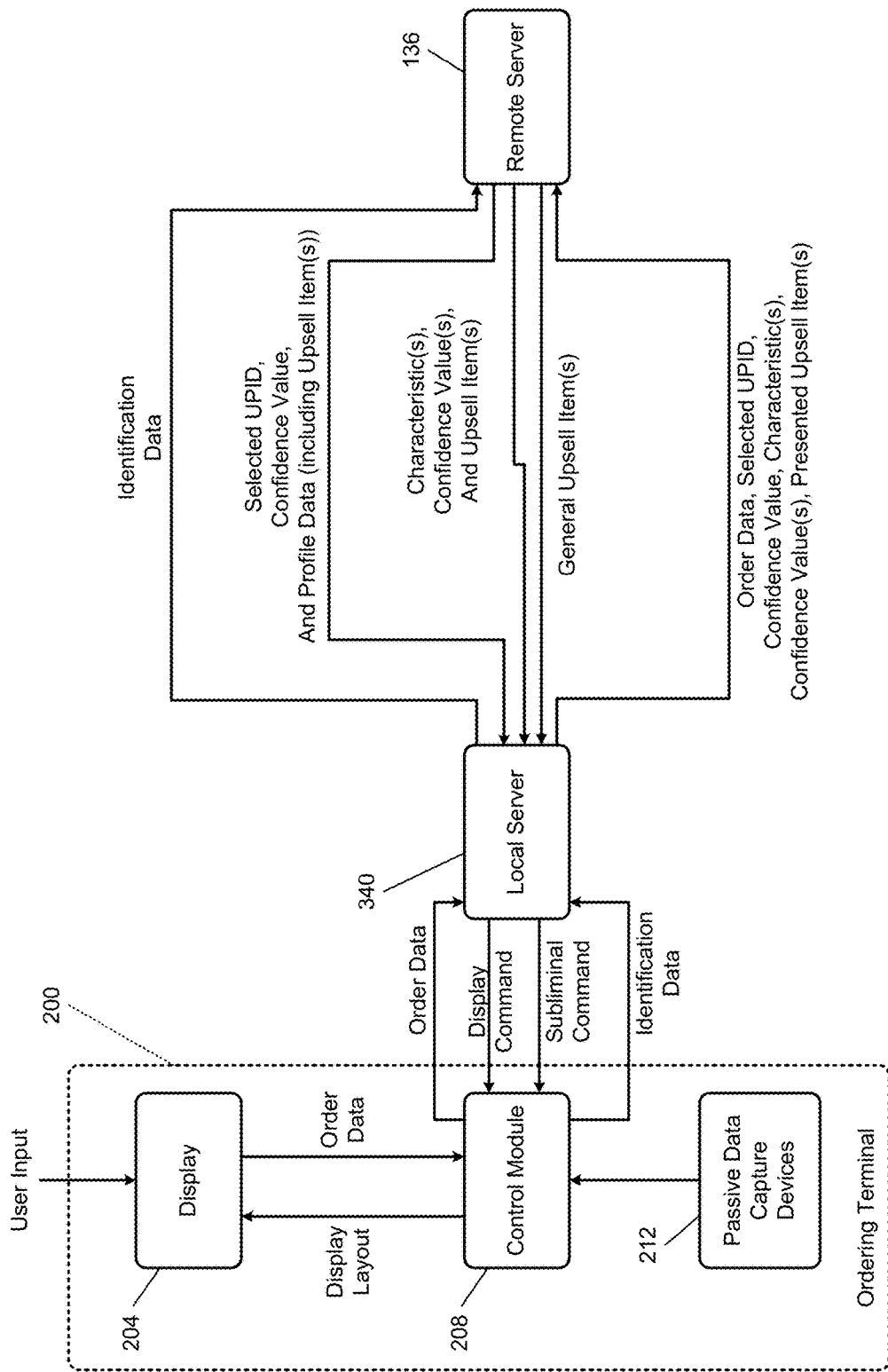
FIG. 13 is a functional block diagram of an example ordering system.

FIG. 13 is another functional block diagram of an example ordering system. Referring now to FIGS. 12 and 13, as stated above, the remote server 136 transmits the selected UPID, the overall confidence value calculated for the selected UPID, and the associated profile data to the local server 340. The upsell item(s) associated with the selected UPID is/are part of the associated profile data and is/are therefore transmitted to the local server 340.

The remote server 136 also transmits the general characteristics, the overall confidence values calculated for the general characteristics, and the associated upsell items to the local server 340. Additionally, the upsell module 712 retrieves the upsell item(s) associated with general condition(s) of the general upsell table 708 that is/are satisfied. The remote server 136 also transmits those upsell items to the local server 340.

The local server 340 determines whether subliminal suggestion of upsell items to patrons at the ordering terminal 200 is allowed. If not, none of the upsell items are subliminally suggested to patrons at the ordering terminal 200. If subliminal suggestion of upsell items to patrons at the ordering terminal 200 is allowed, the local server 340 determines which one or more of the upsell items to subliminally suggest to the patron at the ordering terminal 200.

The local server 340 may determine whether subliminal suggestion of upsell items to patrons at the ordering terminal 200 is allowed, for example, based on the state of a flag associated with subliminal suggestion at the ordering terminal 200. For example, the local server 340 may determine that subliminal suggestion of upsell items to patrons at the ordering terminal 200 is allowed when the flag is set to a first state and that subliminal suggestion of upsell items to patrons at the ordering terminal 200 is not allowed when the flag is set to a second state.

One flag may be provided, for example, for each ordering terminal. This may enable an operator of multiple ordering terminals to specify whether subliminal suggestion of upsell items can be performed at each ordering terminal. Additionally or alternatively, flags may be used to indicate whether subliminal suggestion of upsell items can be performed at two or more ordering terminals, such as all ordering terminals located within a building or all ordering terminals located within a geographical region. In various implementations, individual patrons may opt-out of the use of subliminal suggestion. In such implementations, the local server 340 may determine whether subliminal suggestion of upsell items to the patron at the ordering terminal 200 is allowed.

If subliminal suggestion of upsell items is allowed, the local server 340 determines which one or more upsell items to subliminally suggest to the patron at the ordering terminal 200. The local server 340 generates a subliminal command that indicates which one or more upsell items to subliminally suggest to the patron at the ordering terminal 200.

In response to the subliminal command, the control module 208 subliminally suggests the one or more upsell items to the patron at the ordering terminal 200 while the patron places his or her order. The patron may add the upsell item(s) in response to the subliminal suggestion of the upsell item(s). For example, the control module 208 may insert an image of an upsell item in place of the ordering menu at a predetermined frequency set such that the image is subliminally perceived by the patron at the ordering terminal 200, but is not consciously perceived by the patron at the ordering terminal 200. For example only, for displays having frequencies (refresh rates) of 60 Hertz or greater, the control module 208 may insert an image of an upsell item in place of the ordering menu at a frequency of 1 Hz or less.

As another example, the control module 208 may output an audible message regarding an upsell item via one or more speakers at a frequency that may be subliminally perceived by the patron at the ordering terminal 200, but should not be consciously perceived by the patron at the ordering terminal 200. For example, the control module 208 may generate an audible message having a frequency that is less than 20 Hz or greater than 20,000 Hz or outside of a normal audible range of humans. Alternatively, the control module 208 may output an audible message at a volume that is less than a volume that audio information is normally conveyed.

As yet another example, the control module 208 may control a scent generator to generate a scent indicative of an upsell item such that the scent is subliminally perceived by the patron at the ordering terminal 200, but is not consciously perceived by the patron at the ordering terminal 200. This may urge the patron to order that upsell item and, therefore, increase order cost.

Figure 14:
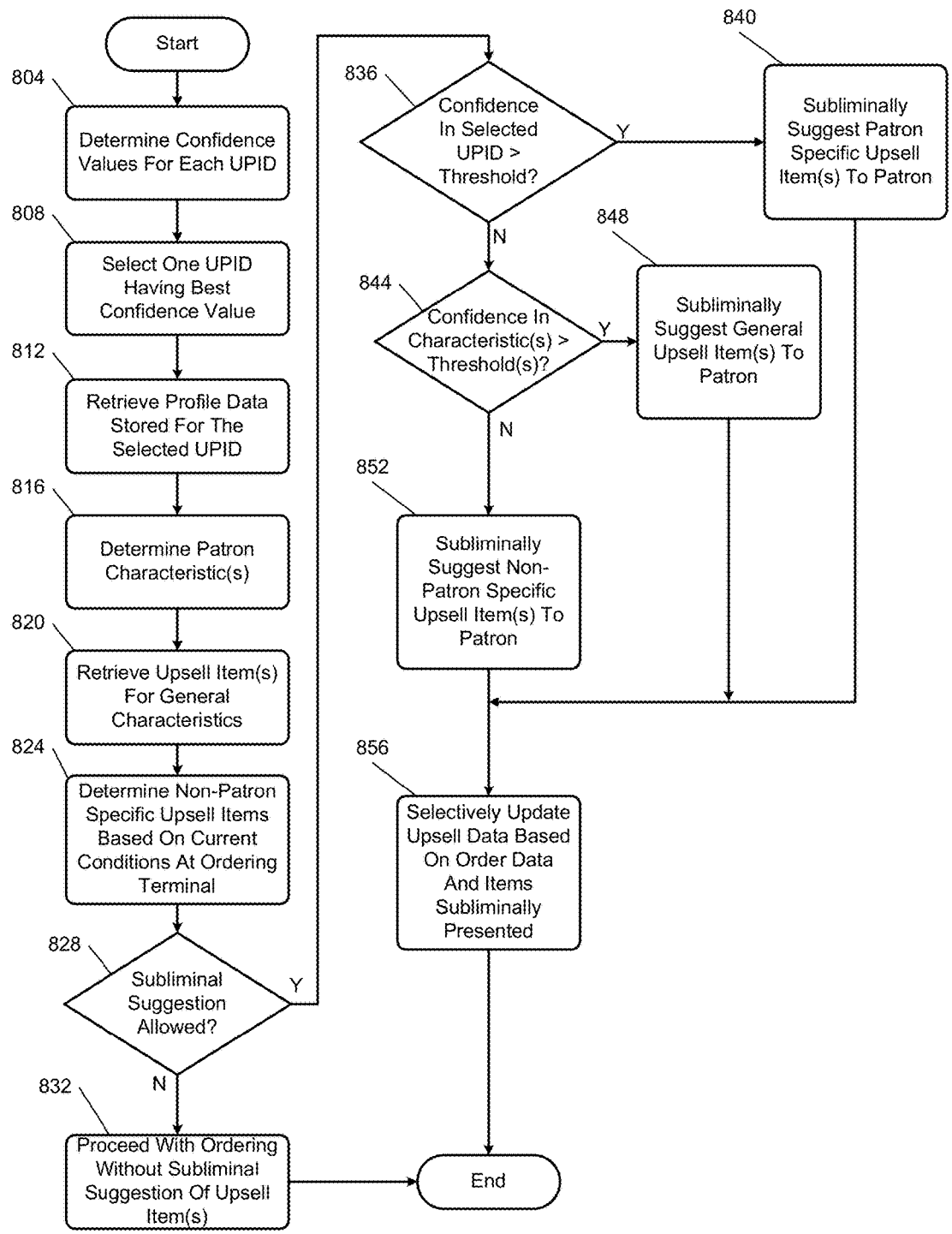
FIG. 14 is a flowchart depicting an example method including controlling ordering items that are subliminally presented to a patron at an ordering terminal.

Referring now to FIG. 14, a flowchart depicting an example method of subliminally suggesting one or more ordering items to a patron at the ordering terminal 200 is presented. Control begins with 804 when a patron is present at the ordering terminal. At 804, overall confidence values for the UPIDs are calculated. The overall confidence value for a given one of the UPIDs is calculated based on comparisons of the captured identification data with stored identification data associated with that one of the UPIDs. The overall confidence value of a given one of the UPIDs may increase as closeness between captured identification data and stored identification data associated with that UPID increases, and vice versa. Calculation of partial and overall confidence values is discussed above.

At 808, one of the UPIDs is selected based on the overall confidence values. For example, the one of the UPIDs having the highest confidence value may be selected at 808. The profile data associated with the selected UPID is retrieved from the profile tables 328 at 812. The profile data includes, among other things, patron-specific upsell data indicative of one or more upsell items associated with the selected UPID.

At 816, a determination is made as to whether the patron at the ordering terminal 200 satisfies one or more of the general characteristics. For example, the characteristic determination module 504 may determine that the patron satisfies a general characteristic (e.g., male, female, larger, smaller, older, middle-aged, younger, etc.) when the overall confidence value calculated for the UPID for that general characteristic is greater than a corresponding predetermined value. At 820, general characteristic upsell items for the satisfied general characteristics, respectively, are retrieved.

At 824, non-patron specific (and non-general characteristic specific) upsell items are identified based on comparisons of the present conditions at the ordering terminal 200 with the conditions stored in the general upsell table 708. Upsell items for the satisfied conditions, respectively, are retrieved at 824.

At 828, a determination is made as to whether subliminal suggestion is allowed. If 828 is false, the control module 208 allows the ordering process to proceed without subliminally suggesting any upsell items to the patron at 832. If 828 is true, control may proceed with 836.

At 836, a determination is made as to whether the confidence value of the selected UPID is greater than a seventeenth predetermined value for subliminally suggesting the patron specific upsell item(s) associated with the selected UPID. If 836 is true, the control module 208 subliminally suggests the upsell item(s) to the patron at the ordering terminal 200 at 840, and control continues with 856. For example, the control module 208 may display an image of an upsell item at a predetermined frequency set such that the image is subliminally perceived by the patron at the ordering terminal 200, but is not consciously perceived by the patron at the ordering terminal 200. As another example, the control module 208 may output an audible message regarding an upsell item via one or more speakers at a frequency that may be subliminally perceived by the patron at the ordering terminal 200, but is not consciously perceived by the patron at the ordering terminal 200. As yet another example, the control module 208 may output a scent indicative of an upsell item via a scent generator such that the scent is subliminally perceived by the patron at the ordering terminal 200, but is not consciously perceived by the patron at the ordering terminal 200. If 836 is false, control continues with 844.

At 844, a determination is made as to whether the confidence value(s) for the general characteristic(s) that the patron satisfies are greater than an eighteenth predetermined value for subliminally suggesting general characteristic upsell item(s) associated with the satisfied general characteristic(s). The eighteenth predetermined value may be the same as or different than the seventhteenth predetermined value. For example, the eighteenth confidence value may be less than the seventeenth predetermined value. If 844 is true, the control module 208 subliminally suggests the upsell item(s) associated with the satisfied general characteristic(s) to the patron at the ordering terminal 200 at 848, and control continues with 856. Examples of ways to subliminally suggest the general characteristic upsell item(s) are provided above. If 844 is false, control may continue with 852.

At 852, the control module 208 subliminally suggests the non-patron (and non-general characteristic) specific upsell items identified using the general upsell table 708 to the patron at the ordering terminal. Examples of ways to subliminally suggest the general characteristic upsell item(s) are provided above.

At 856, once the patron's order is complete, the upsell table 704 and/or the general upsell table 712 may be updated based on the order data and the upsell items subliminally suggested to the patron. For example, if at least a first predetermined number of patrons satisfying a general characteristic have been subliminally suggested an upsell item and less than a second predetermined number of those patrons have ordered that upsell item, the upsell module 712 may remove the association between that general characteristic and the upsell item and associate another upsell item with the general characteristic. As another example, a patron associated with a UPID has been subliminally suggested an upsell item associated with that UPID during at least a third predetermined number of orders and the patron has ordered the upsell item in less than a fourth predetermined number of those orders, the upsell module 712 may remove the association between that upsell item and the UPID and associate another upsell item with that UPID.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A method of upselling ordering items, the method comprising:
   in response to detection of a patron at or approaching an ordering terminal, capturing N sets of identification data for the patron using N passive data capture devices, respectively,
   wherein N is an integer greater than one, the N passive data capture devices including at least two of a wireless transceiver, a first camera arranged to capture an image of a face of the patron, a microphone, a scent sensor, an infrared transceiver, a second camera arranged to capture an image of a wheel of a vehicle, a third camera arranged to capture an image of a front portion of a vehicle at the ordering terminal, and a fourth camera arranged to capture an image of a rear portion of a vehicle at the ordering terminal;
   transmitting the N sets of identification data captured using the N passive data capture devices to a server;
   calculating, by the server, an overall confidence value indicating a level of confidence that the patron is associated with a unique patron identifier based on N comparisons of the N sets of identification data captured using the N passive data capture devices with N sets of previously stored identification data, respectively, associated with the unique patron identifier;
   based on the unique patron identifier, retrieving stored data indicative of an ordering item that is to be suggested to the patron during ordering;
   selectively retrieving stored data indicative of a second ordering item that is to be suggested to patrons during ordering;
   displaying an ordering menu by the ordering terminal;
   when the overall confidence value is greater than a predetermined value, suggesting, by the ordering terminal, the ordering item to the patron while the patron places an order, the suggesting including displaying an image of the ordering item at a predetermined frequency of 1 Hertz or less on a display of the ordering terminal; and,
   when the overall confidence value is less than the predetermined value, suggesting, by the ordering terminal, the second ordering item to the patron while the patron places the order, the suggesting including displaying an image of the second ordering item at the predetermined frequency of 1 Hertz or less on the display of the ordering terminal.

2. The method of claim 1 wherein the suggesting the ordering item to the patron at the ordering terminal further includes outputting sound associated with the ordering item outside of a predetermined frequency range using a speaker of the ordering terminal.

3. The method of claim 1 wherein the suggesting the ordering item to the patron at the ordering terminal further includes outputting, using a speaker of the ordering terminal, sound associated with the ordering item at a volume that is less than a predetermined volume.

4. The method of claim 1 wherein selectively retrieving stored data indicative of the second ordering item that is to be suggested to patrons during ordering includes retrieving the stored data indicative of the second ordering item when a condition at the ordering terminal satisfies a predetermined condition associated with suggesting the second ordering item to patrons.

5. The method of claim 4 wherein selectively retrieving stored data indicative of the second ordering item that is to be suggested to patrons during ordering includes retrieving the stored data indicative of the second ordering item when a present date is within a predetermined date range associated with suggesting the second ordering item to patrons.

6. The method of claim 4 wherein selectively retrieving stored data indicative of the second ordering item that is to be suggested to patrons during ordering includes retrieving the stored data indicative of the second ordering item when a present time of day at the ordering terminal is within a predetermined time range associated with suggesting the second ordering item to patrons.

7. The method of claim 4 wherein selectively retrieving stored data indicative of the second ordering item that is to be suggested to patrons during ordering includes retrieving the stored data indicative of the second ordering item when a temperature at the ordering terminal is within a predetermined temperature range associated with suggesting the second ordering item to patrons.

8. The method of claim 1 further comprising:
   based on at least one of the N sets of identification data, determining whether the patron has a general characteristic of patrons; and,
   when the patron has the general characteristic:
      retrieving stored data indicative of a second ordering item that is to be suggested to patrons having the general characteristic during ordering; and
      suggesting the second ordering item to the patron while the patron places the order.

9. An ordering system, comprising:
   N passive data capture devices that, in response to detection of a patron, capture N sets of identification data for the patron, respectively, wherein N is an integer greater than one, the N passive data capture devices including at least two of a wireless transceiver, a first camera arranged to capture an image of a face of the patron, a microphone, a scent sensor, an infrared transceiver, a second camera arranged to capture an image of a wheel of a vehicle, a third camera arranged to capture an image of a front portion of a vehicle at an ordering terminal, and a fourth camera arranged to capture an image of a rear portion of a vehicle at the ordering terminal;

a server comprising:
- a confidence calculation module that calculates an overall confidence value indicating a level of confidence that the patron is associated with a unique patron identifier based on N comparisons of the N sets of identification data captured using the N data capture devices with N sets of previously stored identification data, respectively, associated with the unique patron identifier; and
- a profile retrieving module that, based on the unique patron identifier, retrieves stored data indicative of an ordering item that is to be suggested to the patron during ordering; and
- a control module that displays an ordering menu on a display of an ordering terminal, that, via the ordering terminal and when the overall confidence value is greater than a predetermined value, suggests the ordering item to the patron while the patron places an order by displaying an image of the ordering item at a predetermined frequency of 1 Hertz or less on a display of the ordering terminal, and that, via the ordering terminal and when the overall confidence value is less than the predetermined value, suggests a second ordering item to the patron while the patron places an order by displaying an image of the second ordering item at the predetermined frequency of 1 Hertz or less on the display of the ordering terminal.

10. The ordering system of claim 9 wherein the control module suggests the ordering item further by outputting sound associated with the ordering item outside of a predetermined frequency range using a speaker of the ordering terminal.

11. The ordering system of claim 9 wherein the control module suggests the ordering item further by outputting, using a speaker of the ordering terminal, sound associated with the ordering item at a volume that is less than a predetermined volume.

12. The ordering system of claim 9 wherein the control module retrieves the stored data indicative of the second ordering item when a condition at the ordering terminal satisfies a predetermined condition associated with suggesting the second ordering item to patrons.

13. The ordering system of claim 12 wherein the control module retrieves the stored data indicative of the second ordering item when a present date is within a predetermined date range associated with suggesting the second ordering item to patrons.

14. The ordering system of claim 12 wherein the control module retrieves the stored data indicative of the second ordering item when a present time of day at the ordering terminal is within a predetermined time range associated with suggesting the second ordering item to patrons.

15. The ordering system of claim 12 wherein the control module retrieves the stored data indicative of the second ordering item when a temperature at the ordering terminal is within a predetermined temperature range associated with suggesting the second ordering item to patrons.

16. The ordering system of claim 9 further comprising a characteristic determination module that, based on at least one of the N sets of identification data, determines whether the patron has a general characteristic of patrons,
wherein, when the patron has the general characteristic:
- the profile retrieving module further retrieves stored data indicative of a second ordering item that is to be suggested to patrons having the general characteristic during ordering; and
- the control module suggests the second ordering item to the patron while the patron places the order.

17. A method of upselling ordering items, the method comprising:
- in response to detection of a patron at or approaching an ordering terminal, capturing N sets of identification data for the patron using N passive data capture devices, respectively,
wherein N is an integer greater than one, the N passive data capture devices including at least two of a wireless transceiver, a first camera arranged to capture an image of a face of the patron, a microphone, a scent sensor, an infrared transceiver, a second camera arranged to capture an image of a wheel of a vehicle, a third camera arranged to capture an image of a front portion of a vehicle at the ordering terminal, and a fourth camera arranged to capture an image of a rear portion of a vehicle at the ordering terminal;
- transmitting the N sets of identification data captured using the N passive data capture devices to a server;
- calculating, by the server, an overall confidence value indicating a level of confidence that the patron is associated with a unique patron identifier based on N comparisons of the N sets of identification data captured using the N passive data capture devices with N sets of previously stored identification data, respectively, associated with the unique patron identifier;
- based on the unique patron identifier, retrieving stored data indicative of an ordering item that is to be suggested to the patron during ordering;
- by the ordering terminal, displaying an ordering menu;
- when the overall confidence value is greater than a predetermined value, by the ordering terminal, suggesting the ordering item to the patron while the patron places an order by generating a scent corresponding to the ordering item using a scent generator of the ordering terminal;
- selectively retrieving stored data indicative of a second ordering item that is to be suggested to patrons during ordering; and,
- when the overall confidence value is less than the predetermined value, by the ordering terminal, suggesting the second ordering item to the patron while the patron places the order by generating a scent corresponding to the second ordering item using the scent generator of the ordering terminal.

* * * * *